March 7, 1961 A. R. BUCHHOLZ ET AL 2,973,768
COIN COUNTING MACHINE
Filed Aug. 17, 1955 21 Sheets-Sheet 1

INVENTORS
Arnold R. Buchholz
Frank Haban
BY Quarles & French
Attys.

March 7, 1961 A. R. BUCHHOLZ ET AL 2,973,768
COIN COUNTING MACHINE
Filed Aug. 17, 1955 21 Sheets-Sheet 2

INVENTORS
Arnold R. Buchholz
Frank Haban
BY Searles & French
Attys.

March 7, 1961

A. R. BUCHHOLZ ET AL 2,973,768

COIN COUNTING MACHINE

Filed Aug. 17, 1955

INVENTORS
Arnold R. Buchholz
Frank Haban
BY Quarles & French
Att'ys

March 7, 1961. A. R. BUCHHOLZ ET AL 2,973,768
COIN COUNTING MACHINE
Filed Aug. 17, 1955
21 Sheets-Sheet 4
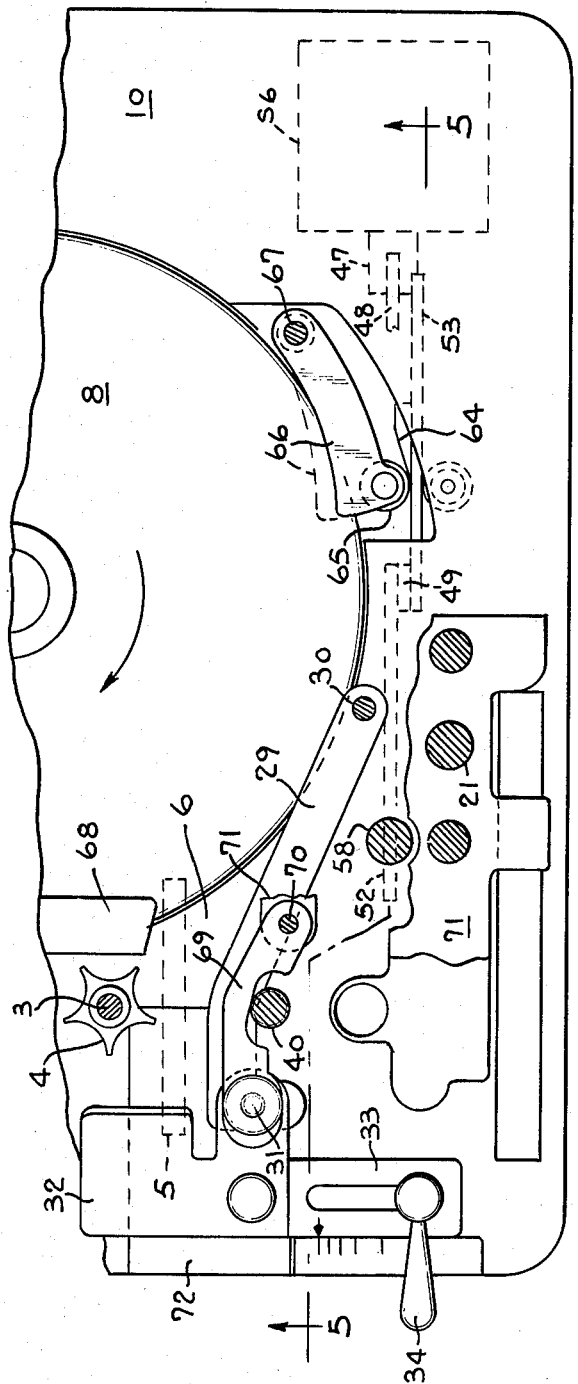
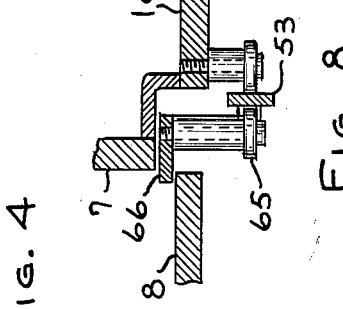
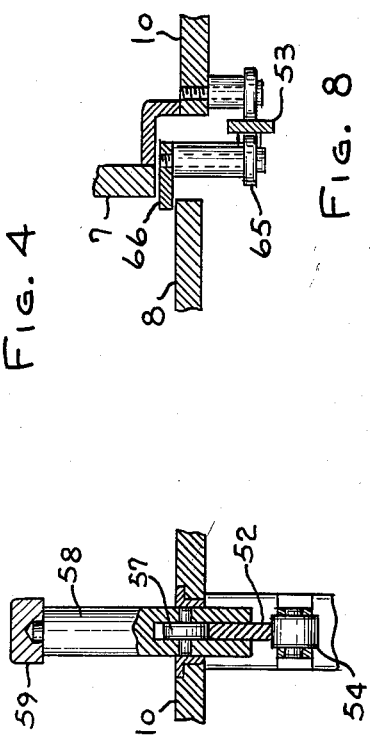
INVENTORS
Arnold R. Buchholz
Frank Habas
BY Quarles & French
Attys.

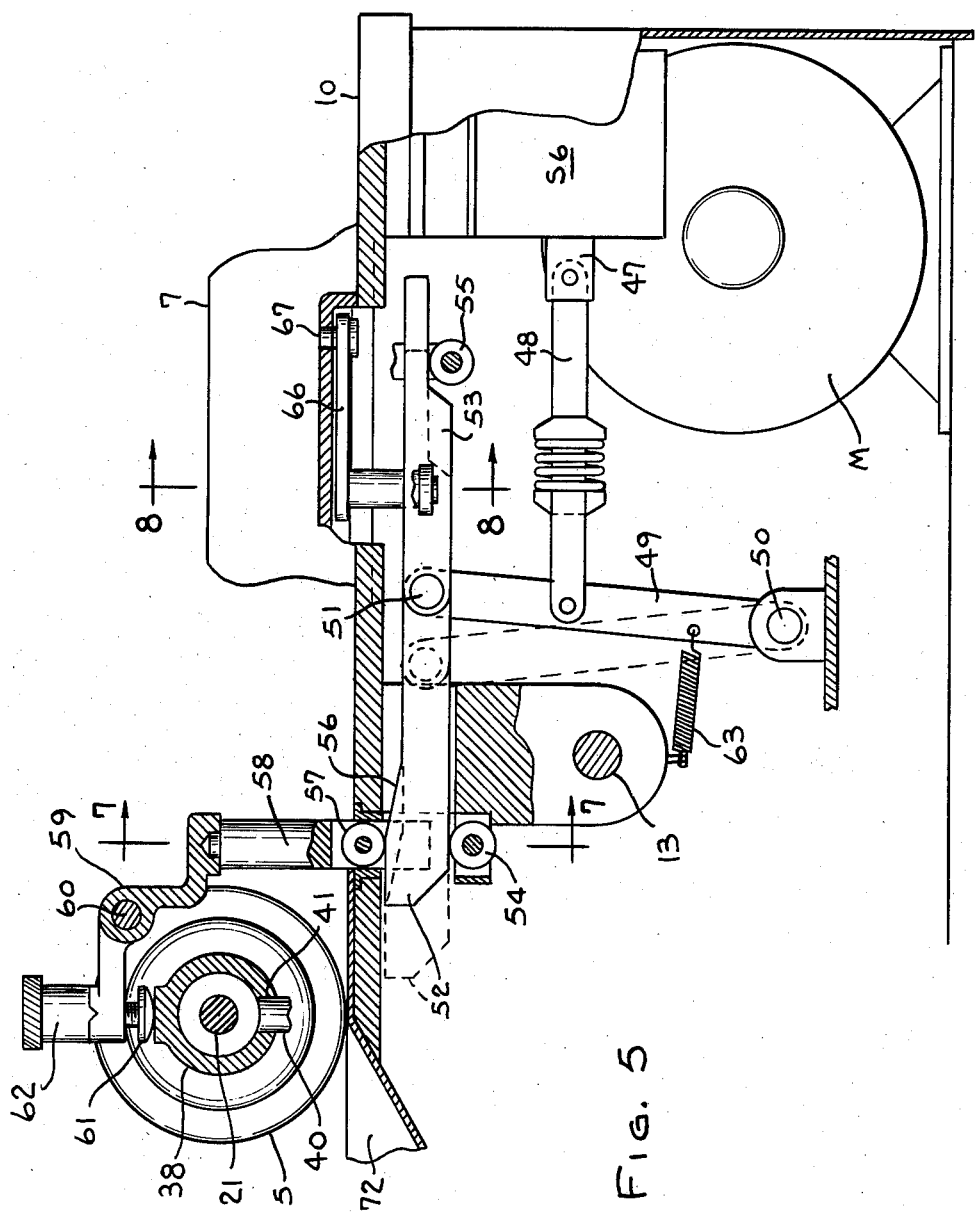

INVENTORS
Arnold R. Buchholz
Frank Habon
BY Quarles & French
Attys.

March 7, 1961

A. R. BUCHHOLZ ET AL 2,973,768

COIN COUNTING MACHINE

Filed Aug. 17, 1955

INVENTORS
Arnold R. Buchholz
Frank Haban
BY Charles & French
Attys.

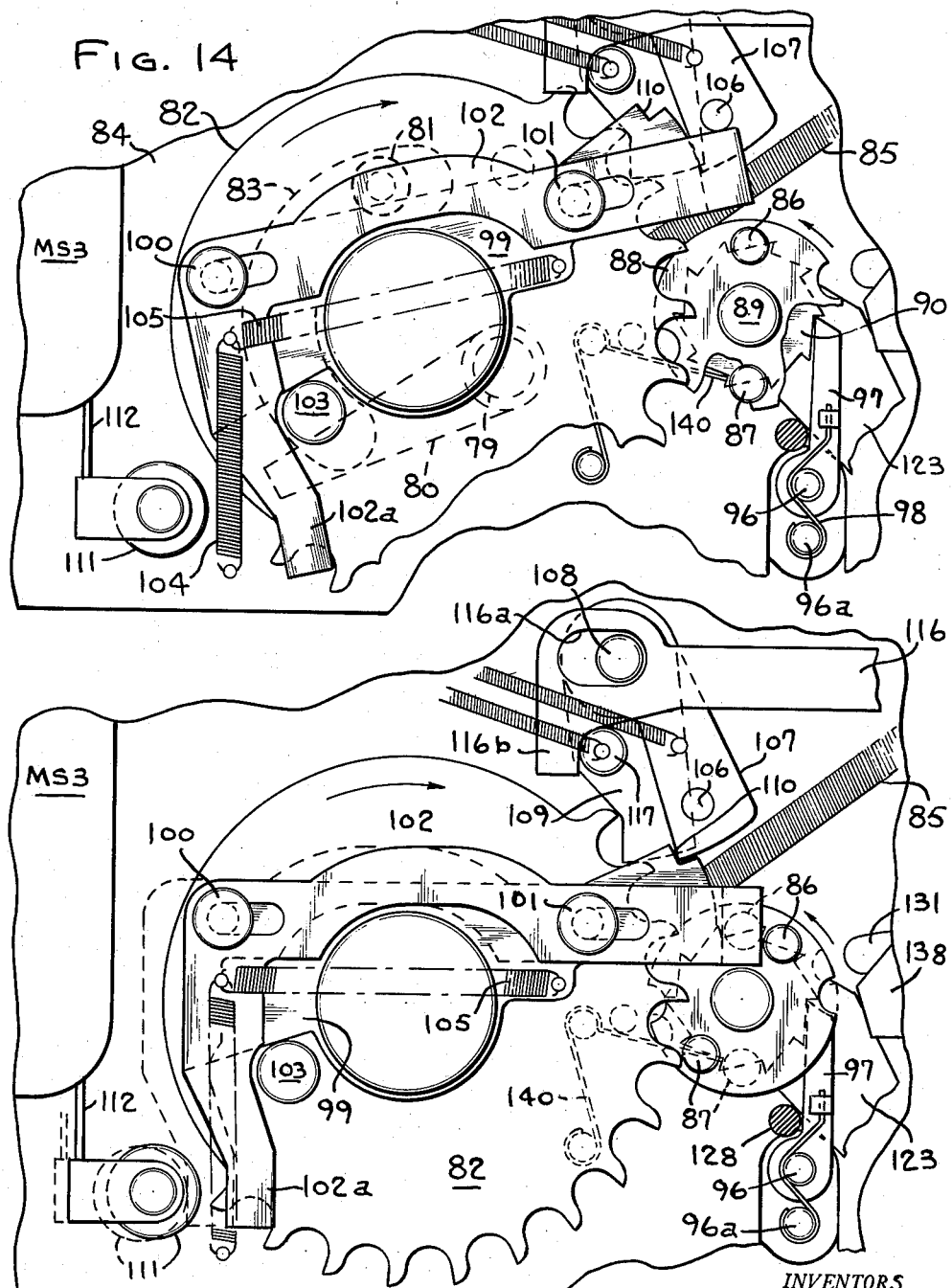

INVENTORS
Arnold R. Buchholz
Frank Haban
BY
Quarles & French
Att'ys.

March 7, 1961

A. R. BUCHHOLZ ET AL 2,973,768

COIN COUNTING MACHINE

Filed Aug. 17, 1955

INVENTORS
Arnold R. Buchholz
Frank Haban
BY Charles & French
Attys.

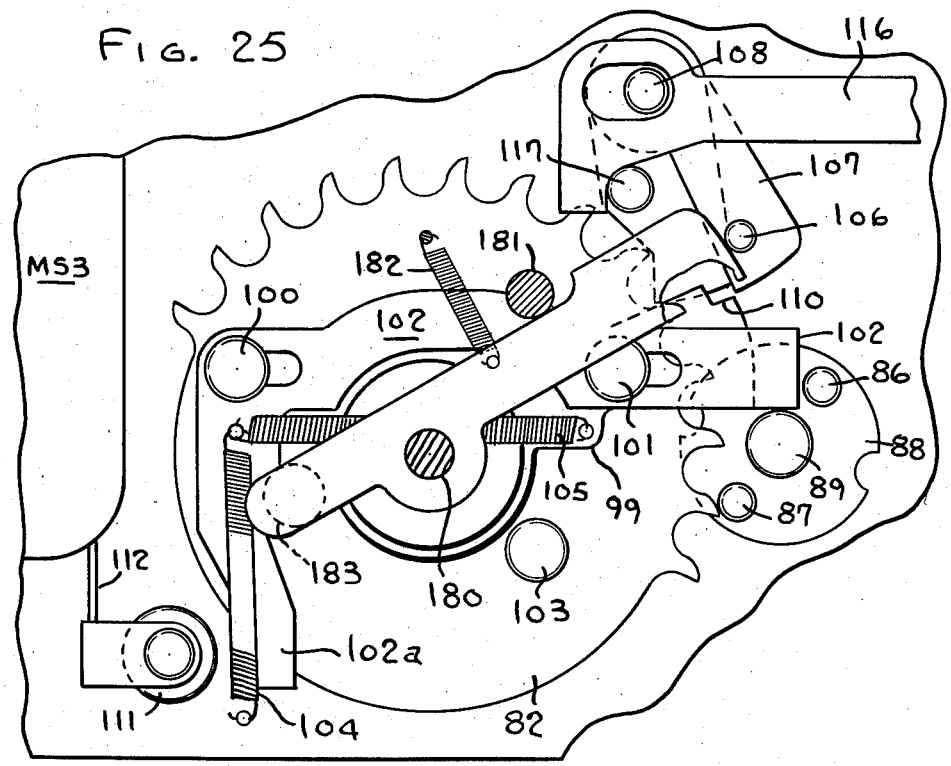
Fig. 25
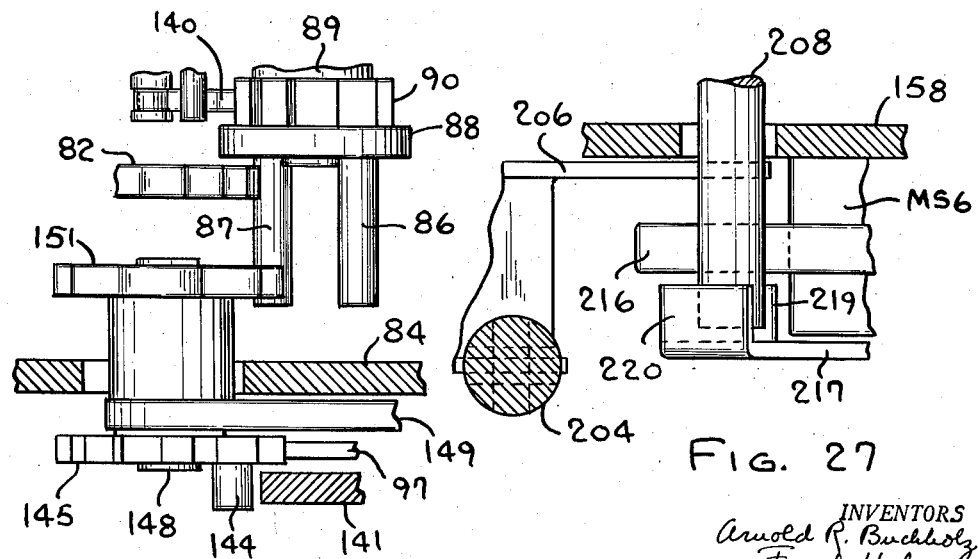
Fig. 26
Fig. 27
INVENTORS
Arnold R. Buchholz
Frank Haban
BY
Quarles & French
Attys.

March 7, 1961 A. R. BUCHHOLZ ET AL 2,973,768
COIN COUNTING MACHINE
Filed Aug. 17, 1955 21 Sheets-Sheet 16
Fig. 28
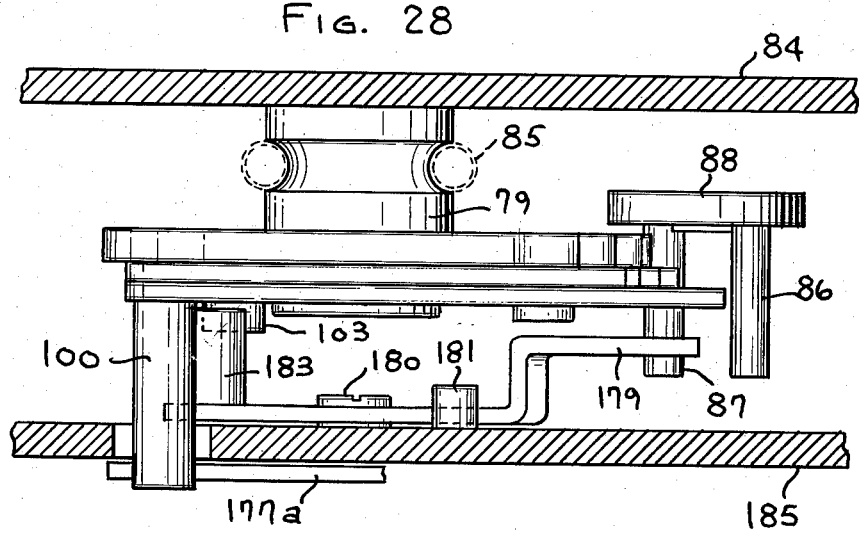
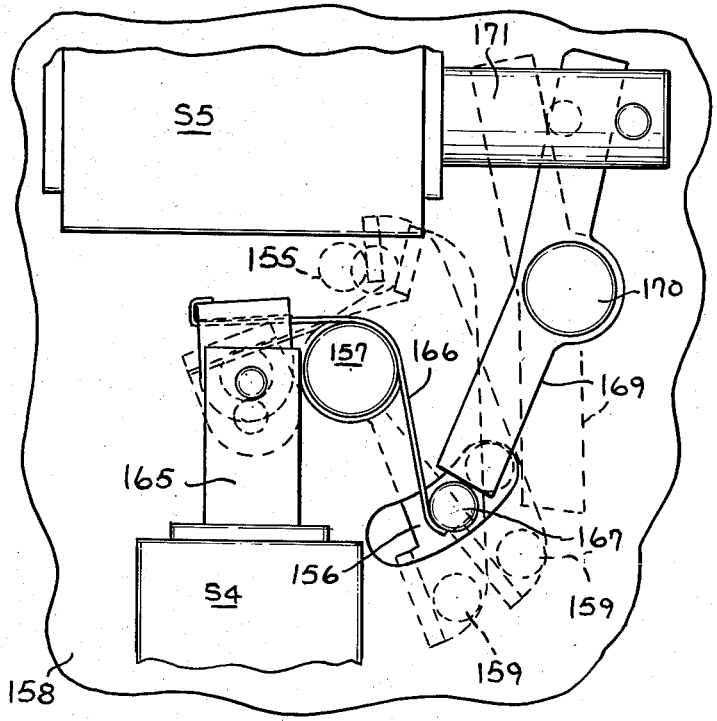
Fig. 29
INVENTORS
Arnold R. Buchholz
Frank Haban
BY
Charles & French
Attys.

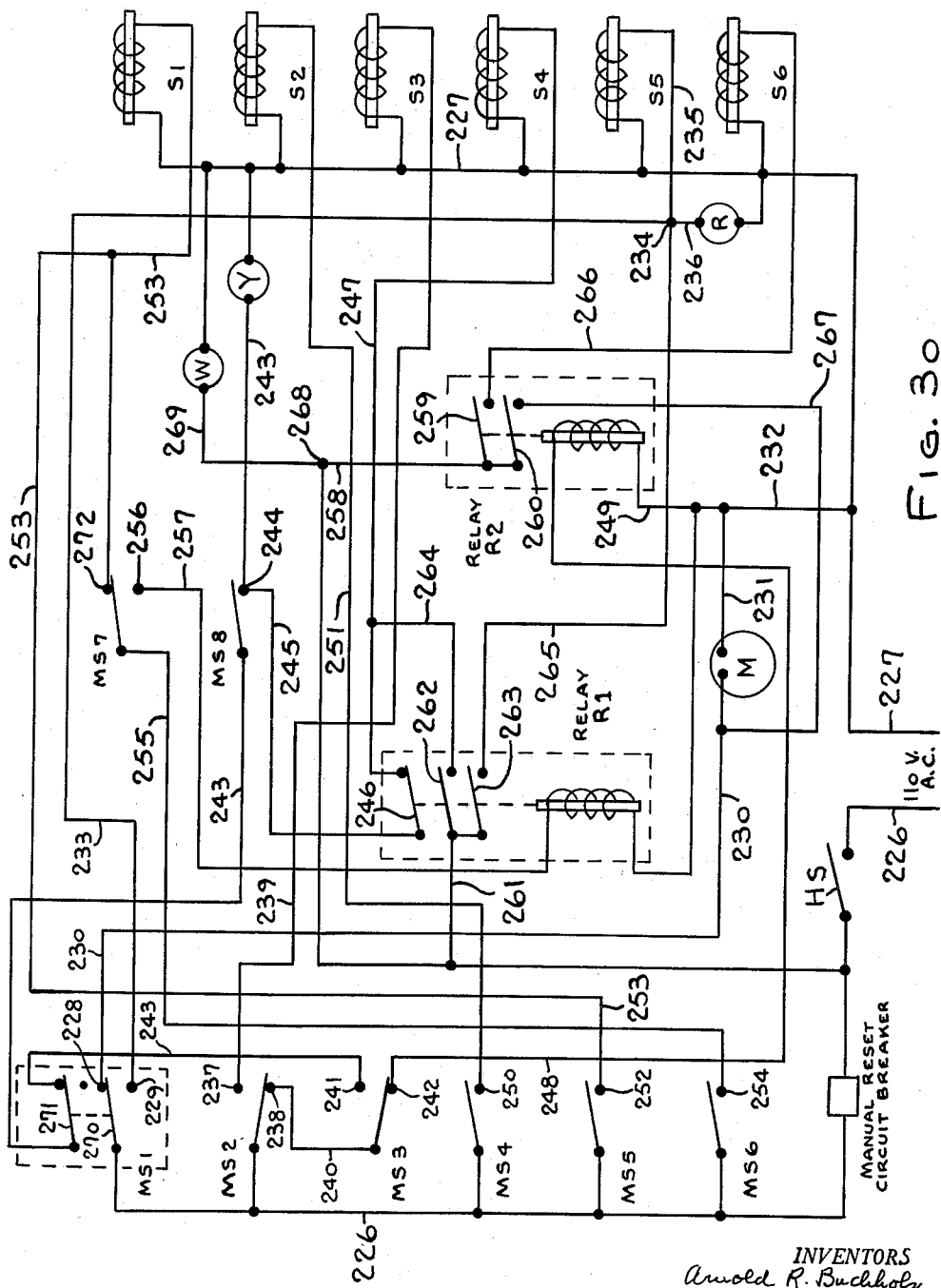

March 7, 1961 A. R. BUCHHOLZ ET AL 2,973,768
COIN COUNTING MACHINE
Filed Aug. 17, 1955 21 Sheets-Sheet 18

INVENTORS
Arnold R. Buchholz
Frank Haban
BY Searles & French
Attys.

March 7, 1961 A. R. BUCHHOLZ ET AL 2,973,768
COIN COUNTING MACHINE
Filed Aug. 17, 1955 21 Sheets-Sheet 21

INVENTORS
Arnold R. Buchholz
Frank Haban
BY Charles French
Att'ys

United States Patent Office 2,973,768
Patented Mar. 7, 1961

2,973,768

COIN COUNTING MACHINE

Arnold R. Buchholz and Frank Haban, Watertown, Wis., assignors to Brandt Automatic Cashier Company, Watertown, Wis., a corporation of Wisconsin Filed Aug. 17, 1955, Ser. No. 528,940

17 Claims. (Cl. 133—8)

The invention relates to coin counting machines.

One object of the invention is to provide a predetermined count mechanism which may be reset to a different predetermined count without the necessity of having to run out the count of a previous predetermined count, or if there are not enough coins to complete a predetermined count, the machine may be set back to zero without running out the count.

A further object of the invention is to provide a predetermined count mechanism having a thousands count that is automatically reset to repeat until a predetermined number of thousand counts have been made.

A further object of the invention is to provide a predetermined count mechanism for small counts of ten to fifty coins associated with a thousand count which is operative even though the predetermined smaller count selected is not a multiple of a thousand.

A further object of the invention is to provide a coin counting machine which will count direct in thousands without the use of the lesser count mechanism and without manual resetting.

A further object of the invention is to provide a coin counting machine that will package continuously in any size package while the thousand count mechanism is disengaged by the simple operation of a manually controlled lever.

The invention further consists in the several features hereinafter set forth and more particularly defined by claims at the conclusion hereof.

In the drawings:

Fig. 4 is a partial view of parts shown in Fig. 2 with parts of the mechanism broken away and parts shown in section;

Fig. 5 is a detailed vertical sectional view taken on the line 5—5 of Fig. 4;

Fig. 7 is a detailed vertical sectional view taken on the line 7—7 of Fig. 5;

Fig. 8 is a detailed vertical sectional view taken on the line 8—8 of Fig. 5;

Fig. 14 is an enlarged view of Fig. 11;

Fig. 15 is a view similar to Fig. 14 showing the parts in a different position;

Figure 12:
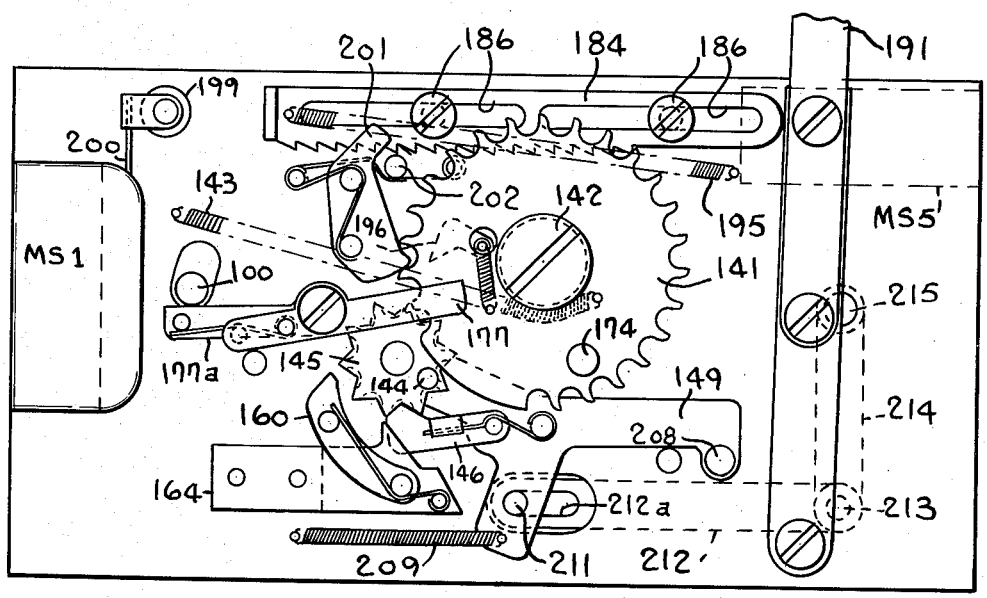
Fig. 12 is a detailed horizontal sectional view taken on the line 12—12 of Fig. 3.
Figure 13:
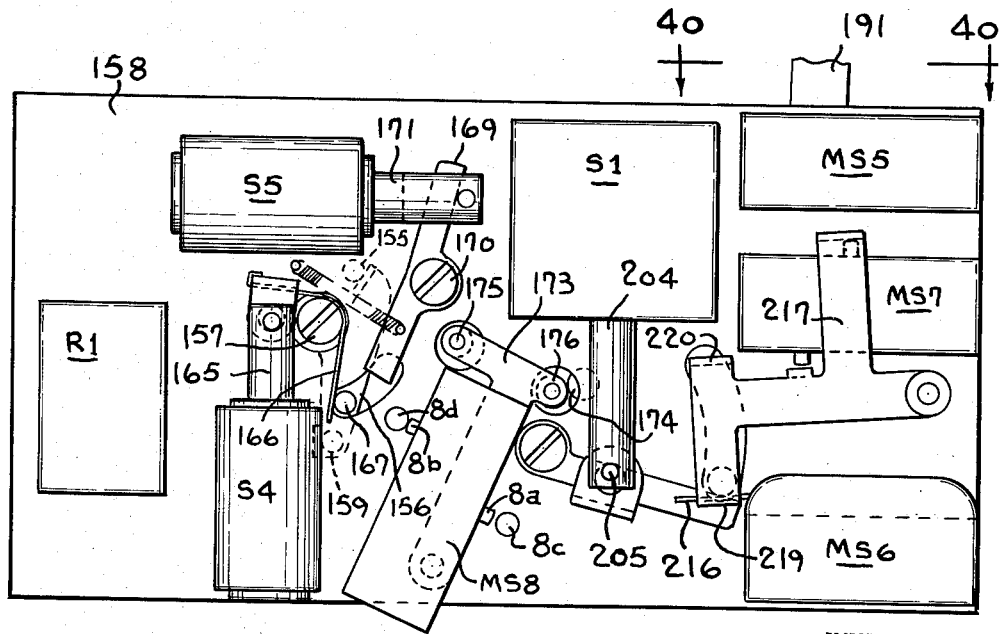
Fig. 13 is a detailed horizontal sectional view taken on the line 13—13 of Fig. 3.
Figure 16:
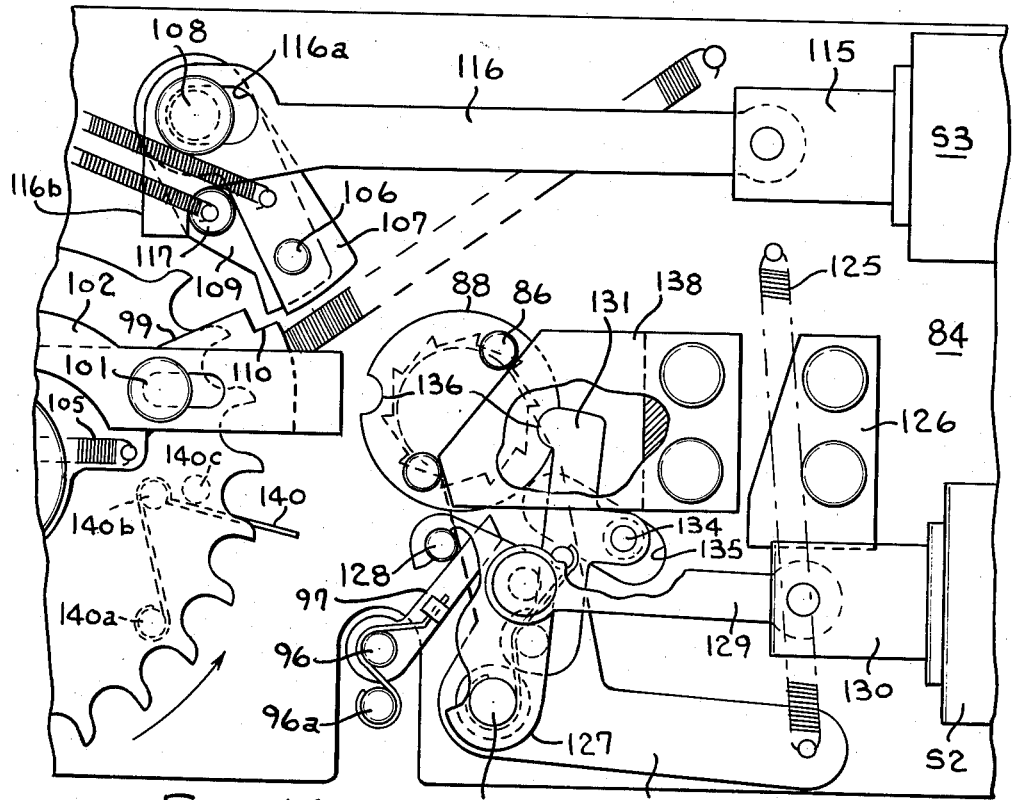
Fig. 16 is an enlarged view similar to Fig. 11 showing other parts to the right of those shown in Fig. 14 during a resetting action.
Figures 17, 18, 19:
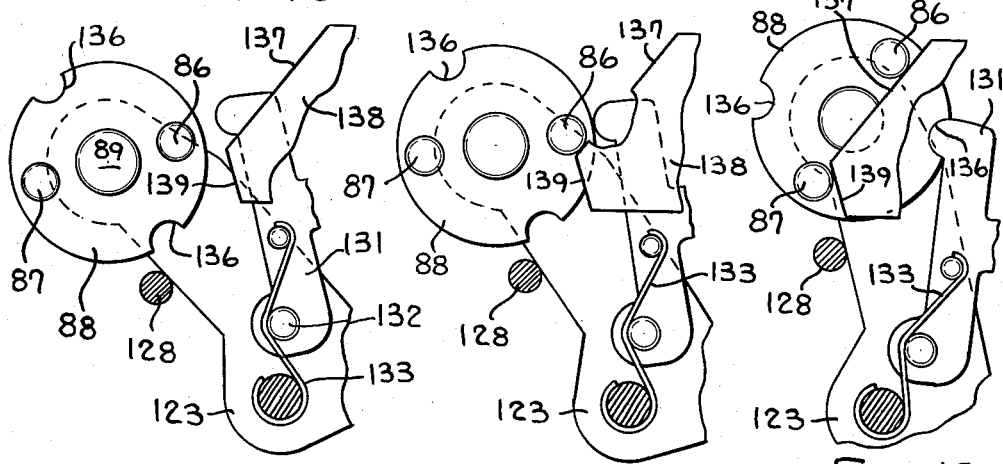
Figure 20:
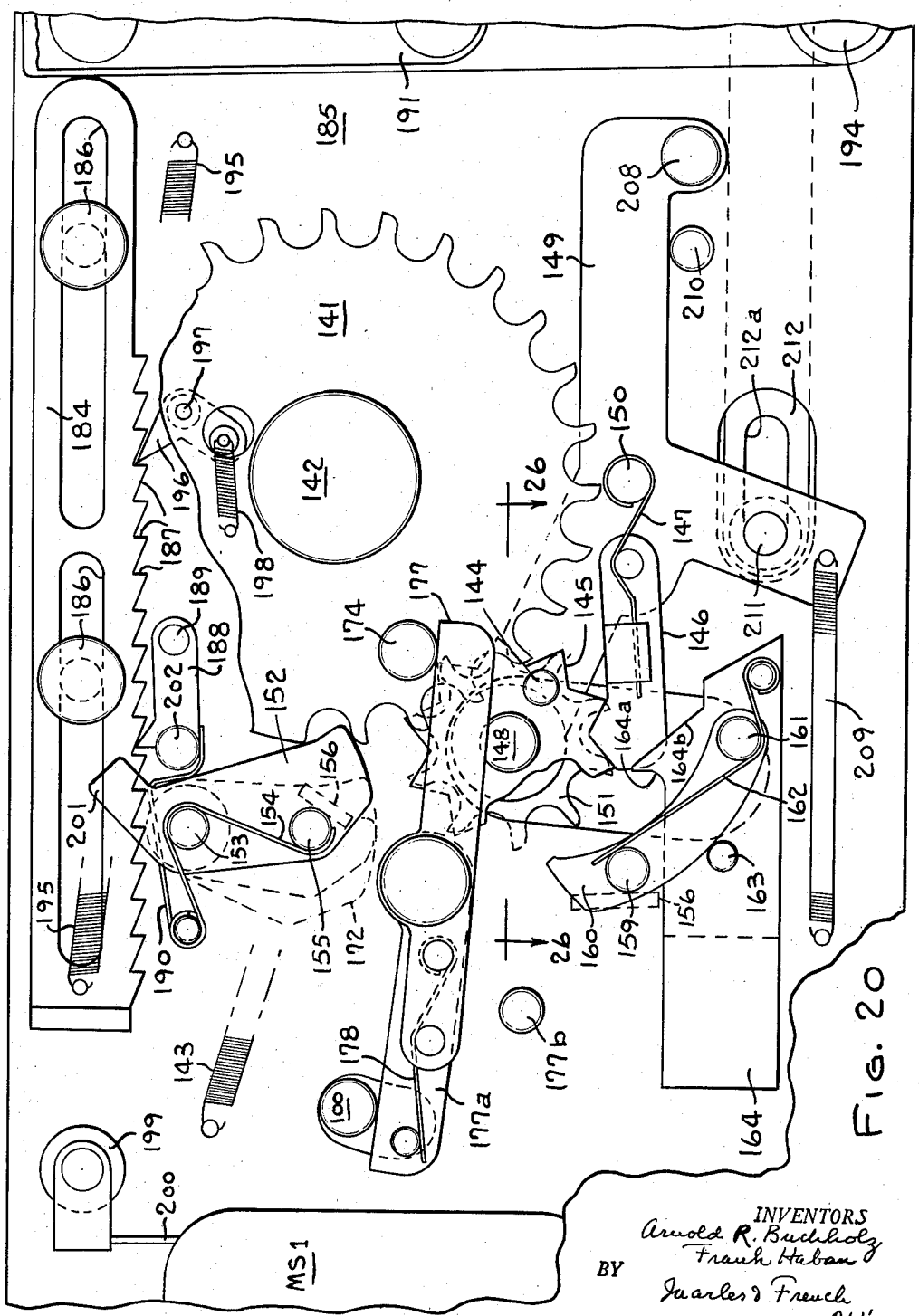
Figure 21:
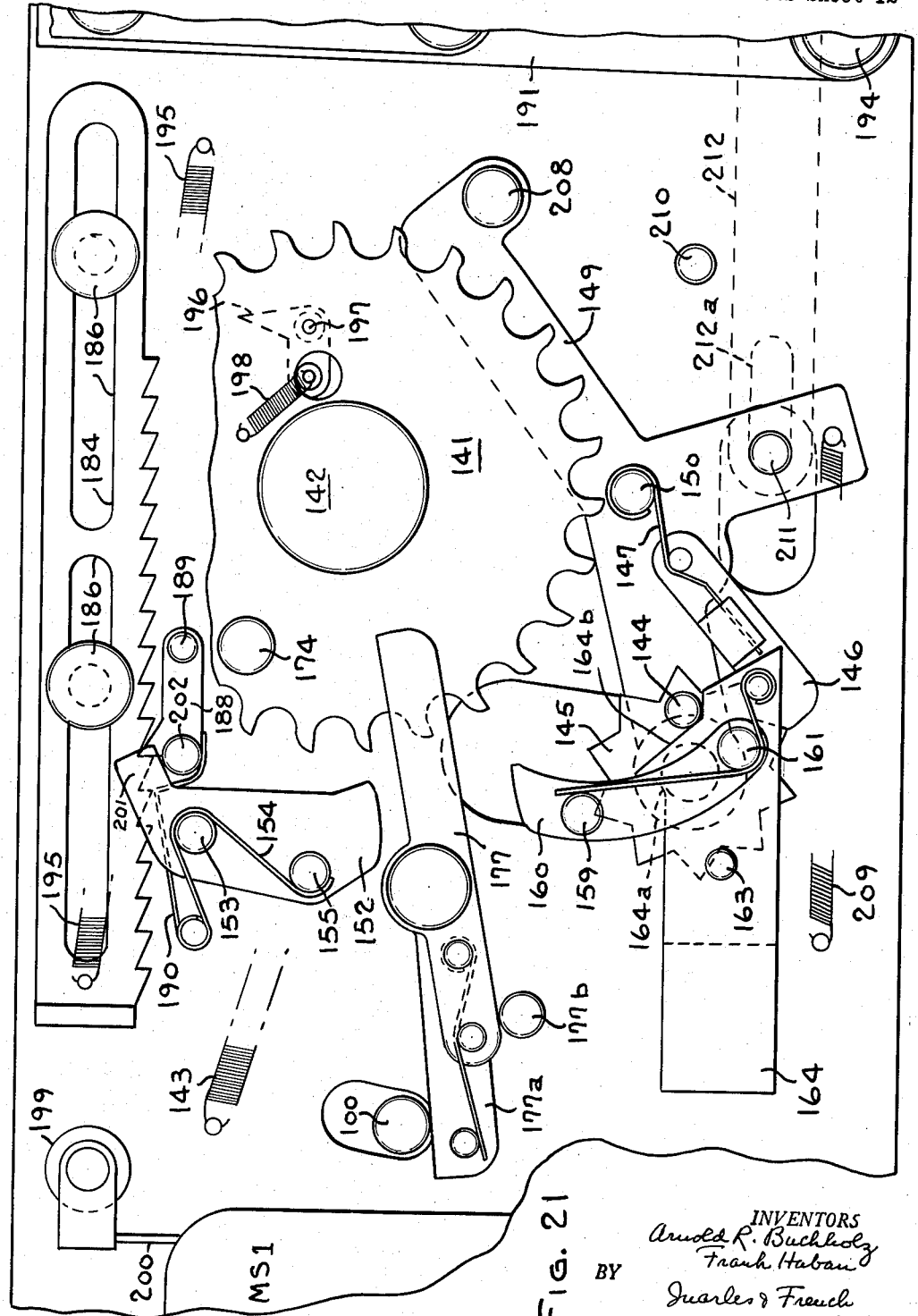
Figure 22:
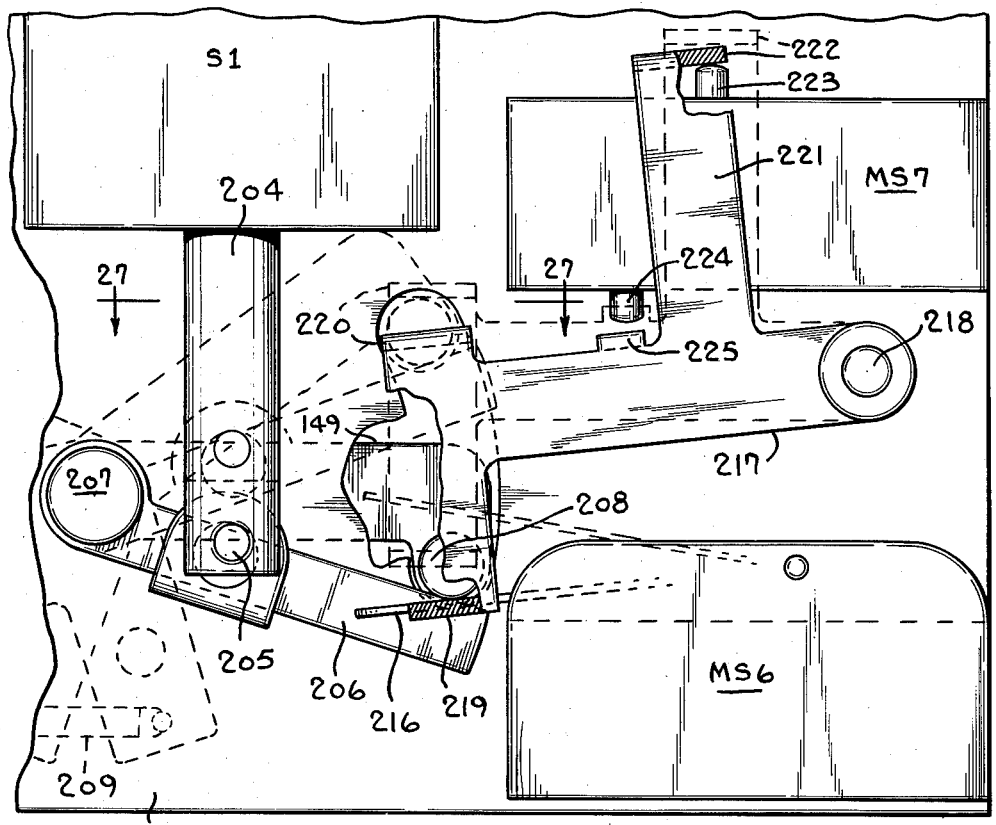
Figure 31:
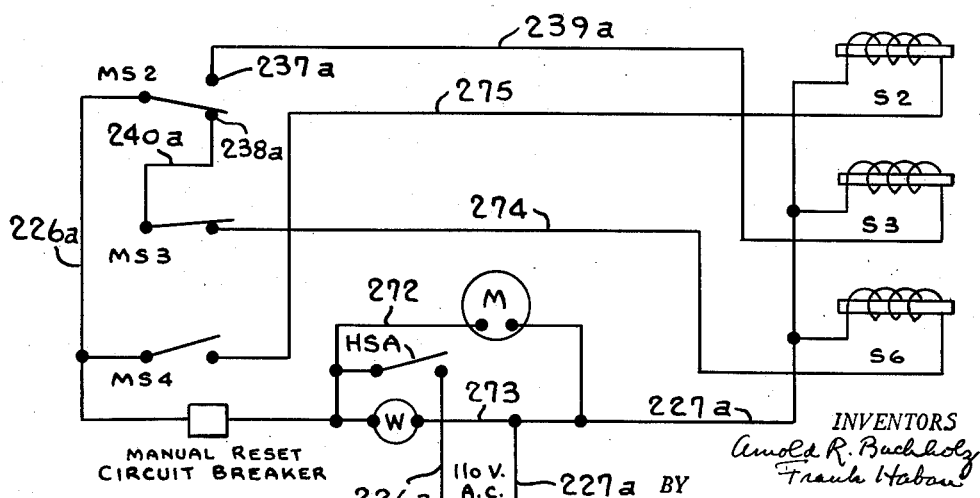
Figure 23:
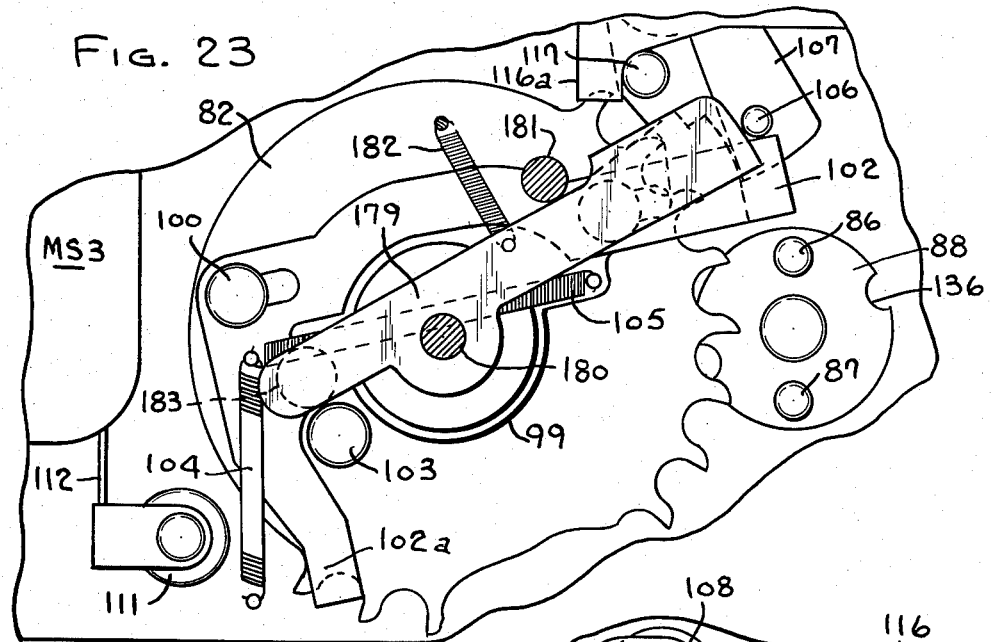
Figure 24:
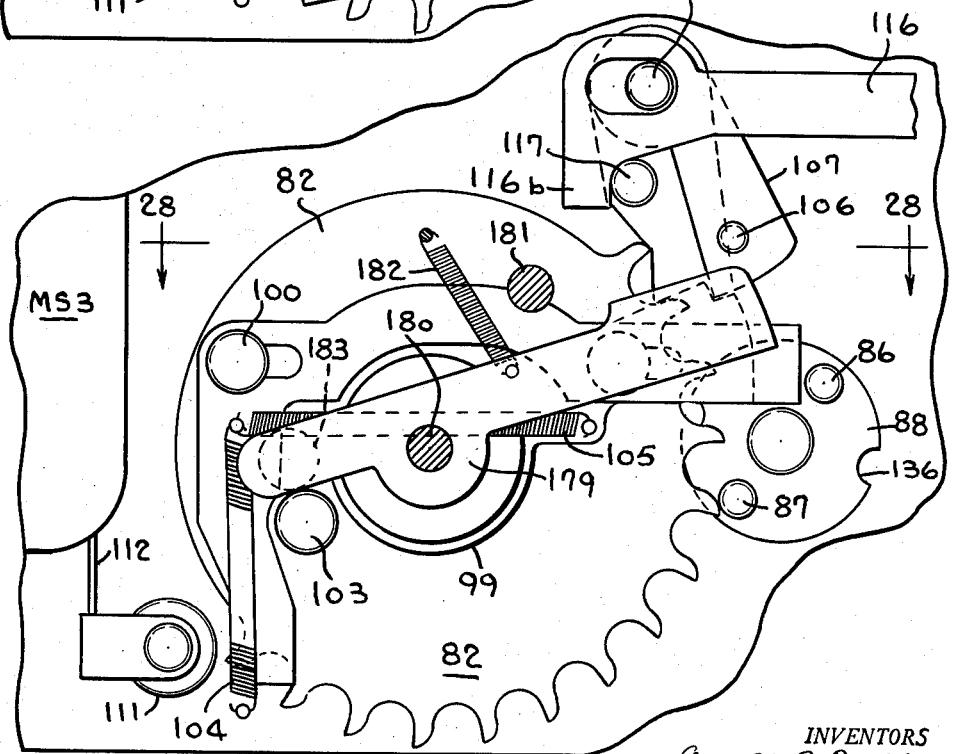
Figure 32:
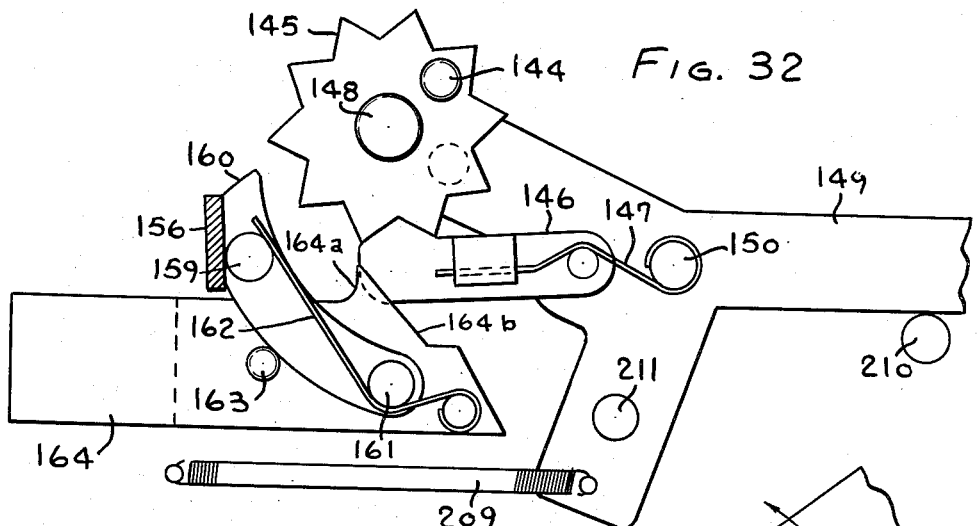
Figure 33:
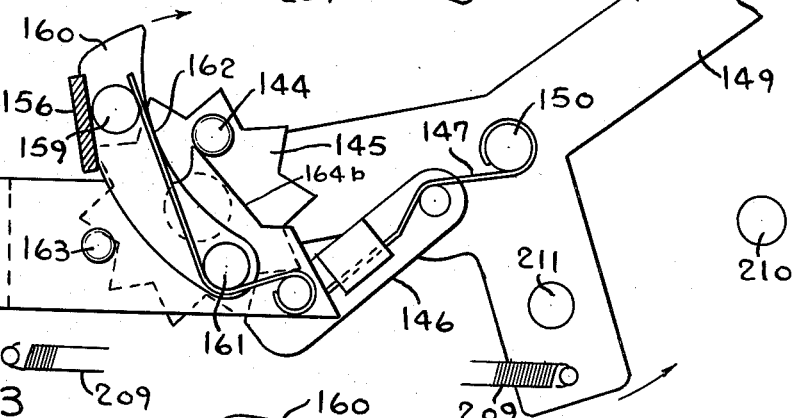
Figure 34:
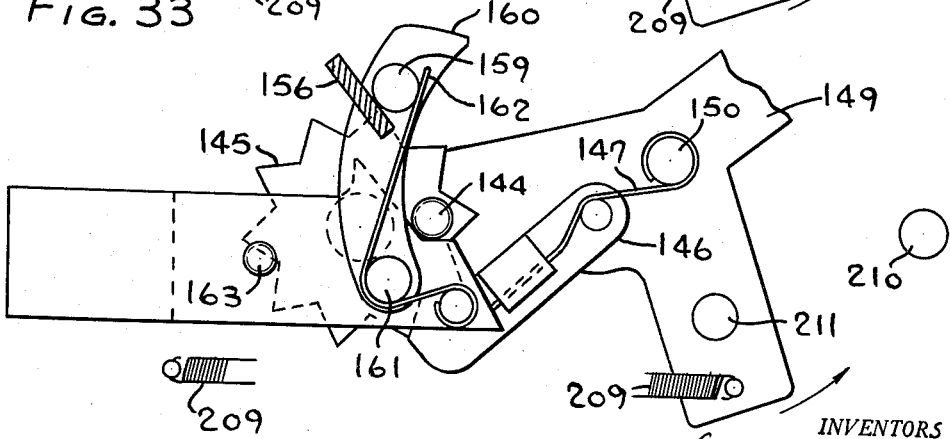
Figure 35:
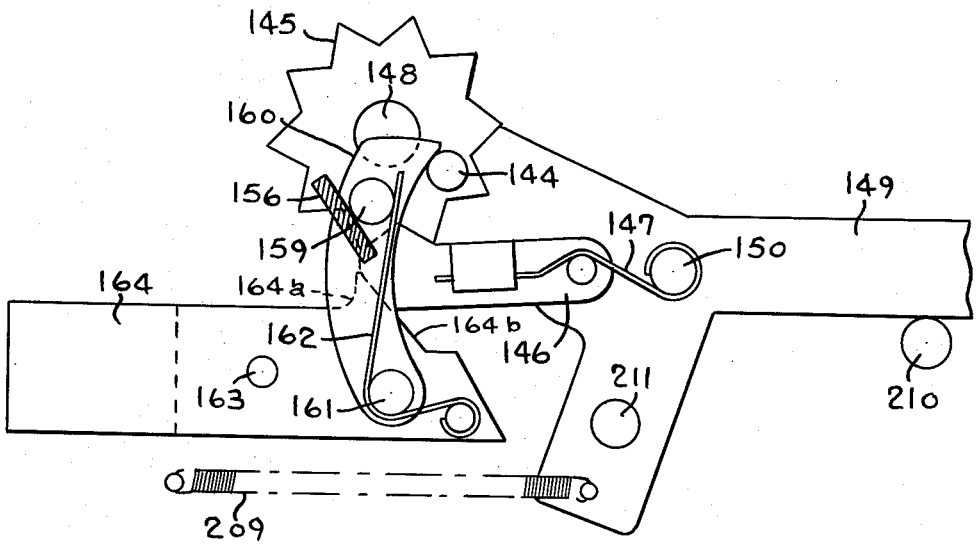
Figure 36:
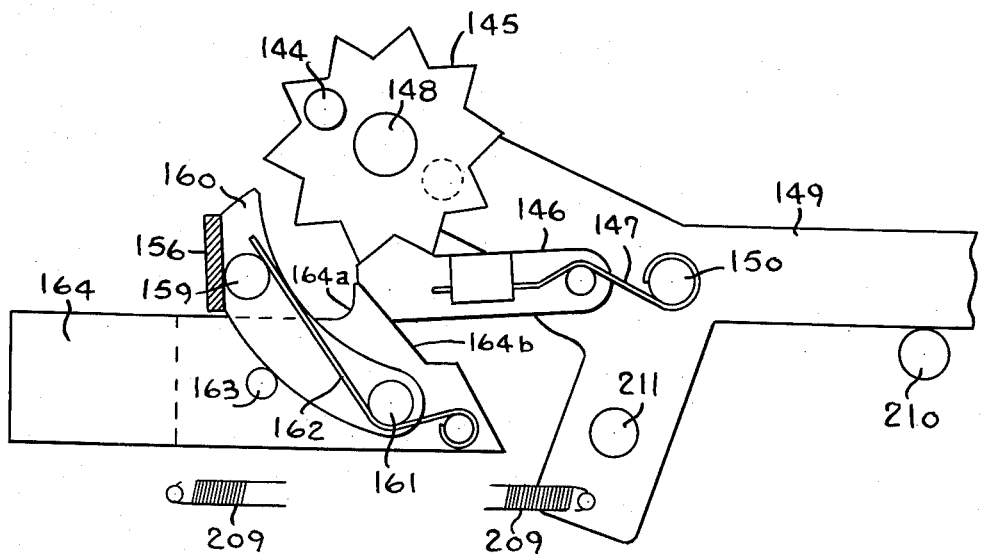
Figure 37:
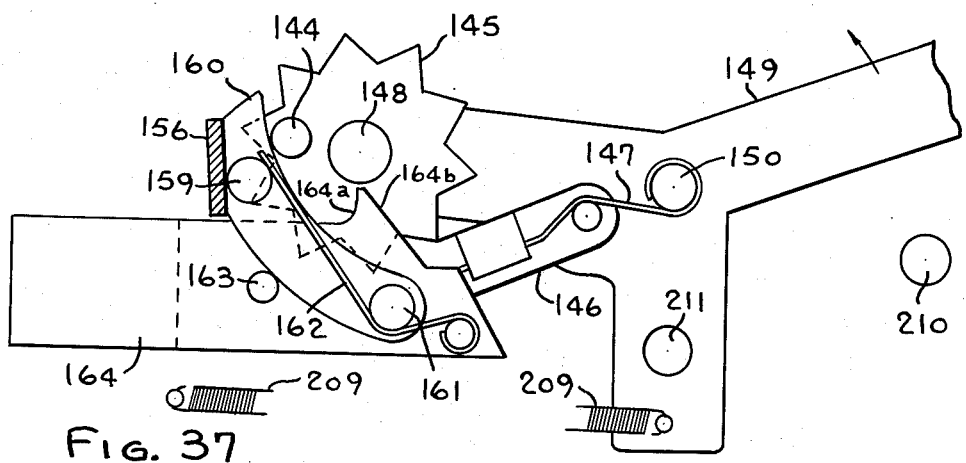
Figure 38:
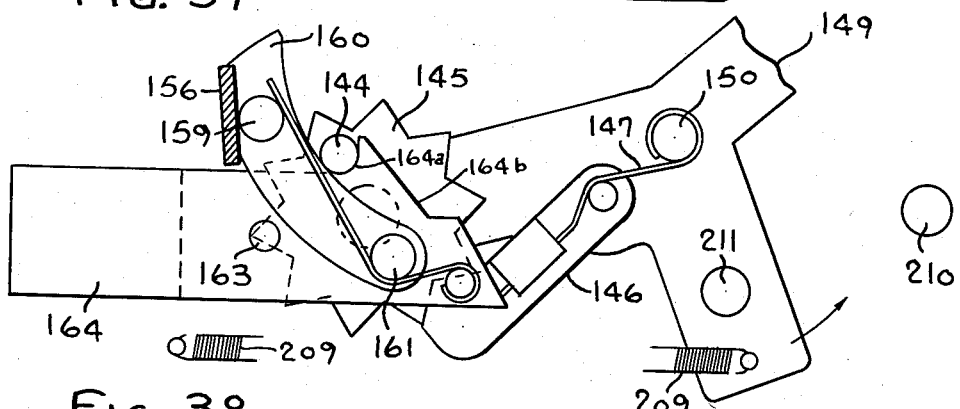
Figure 39:
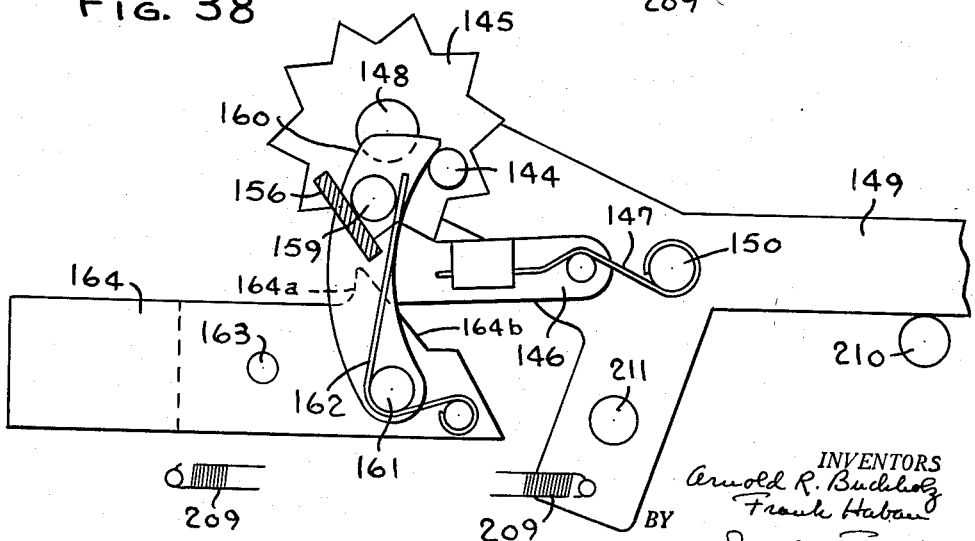
Figure 40:
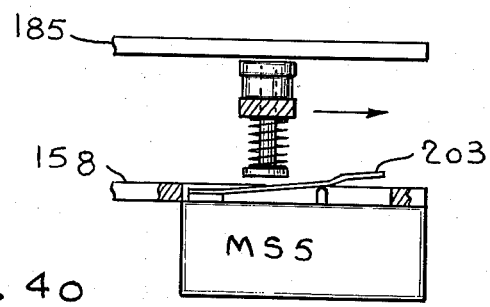
Figure 41:
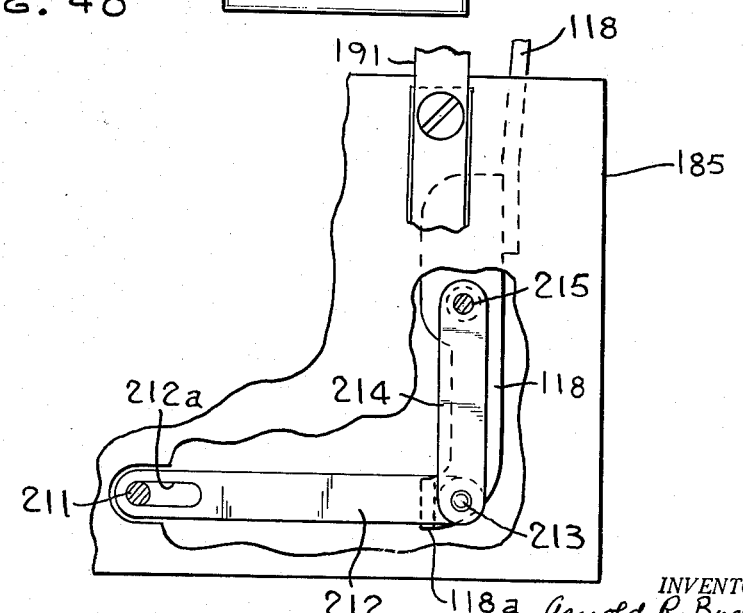

Figs. 17, 18, and 19 are detailed views of parts shown in Fig. 16 showing them in different positions during resetting;

Fig. 20 is an enlarged view of parts shown in Fig. 12 in the position at the end of a thousands count;

Fig. 21 is a view similar to Fig. 20 with parts shown in a different position;

Fig. 22 is an enlarged view of parts shown in Fig. 13 in a different position;

Fig. 23 is a view similar to Fig. 14 with parts omitted;

Fig. 24 is a view similar to Fig. 23 showing the parts in a different position;

Fig. 25 is a view similar to Fig. 23 showing the parts in another position;

Fig. 26 is a detailed vertical sectional view taken on the line 26—26 of Fig. 20;

Fig. 27 is a detailed vertical sectional view taken on the line 27—27 of Fig. 22;

Fig. 28 is a vertical sectional view taken on the line 28—28 of Fig. 24;

Fig. 29 is an enlarged view of parts shown in Fig. 13 in one of their operating positions;

Fig. 30 is a wiring diagram used where the counting machine is adapted to count thousands;

Fig. 31 is a modified wiring diagram for the machine when not provided with the thousands count mechanism;

Fig. 32 is an enlarged view similar to Fig. 20 showing the parts in a different position with the thousand count drive pin to the right of a vertical center line through its drive shaft;

Figs. 33, 34, and 35 are views similar to Fig. 32 showing successive steps in the angular displacement of the pin from the position shown in Fig. 32 to its operative position shown in Fig. 35;

Fig. 36 is an enlarged view similar to Fig. 20 showing the parts in a different position with the thousand count drive pin to the left of a vertical center line through its drive shaft;

Figs. 37, 38, and 39 are views similar to Fig. 36 showing successive steps in the angular displacement of the pin from the position shown in Fig. 36 to its operative position shown in Fig. 39;

Fig. 40 is a detailed horizontal sectional view taken on the line 40—40 of Fig. 13;

Fig. 41 is a fragmentary view similar to Fig. 12 with parts broken away.

It is to be noted that most of the views of the drawings are taken looking up.

Figure 1:
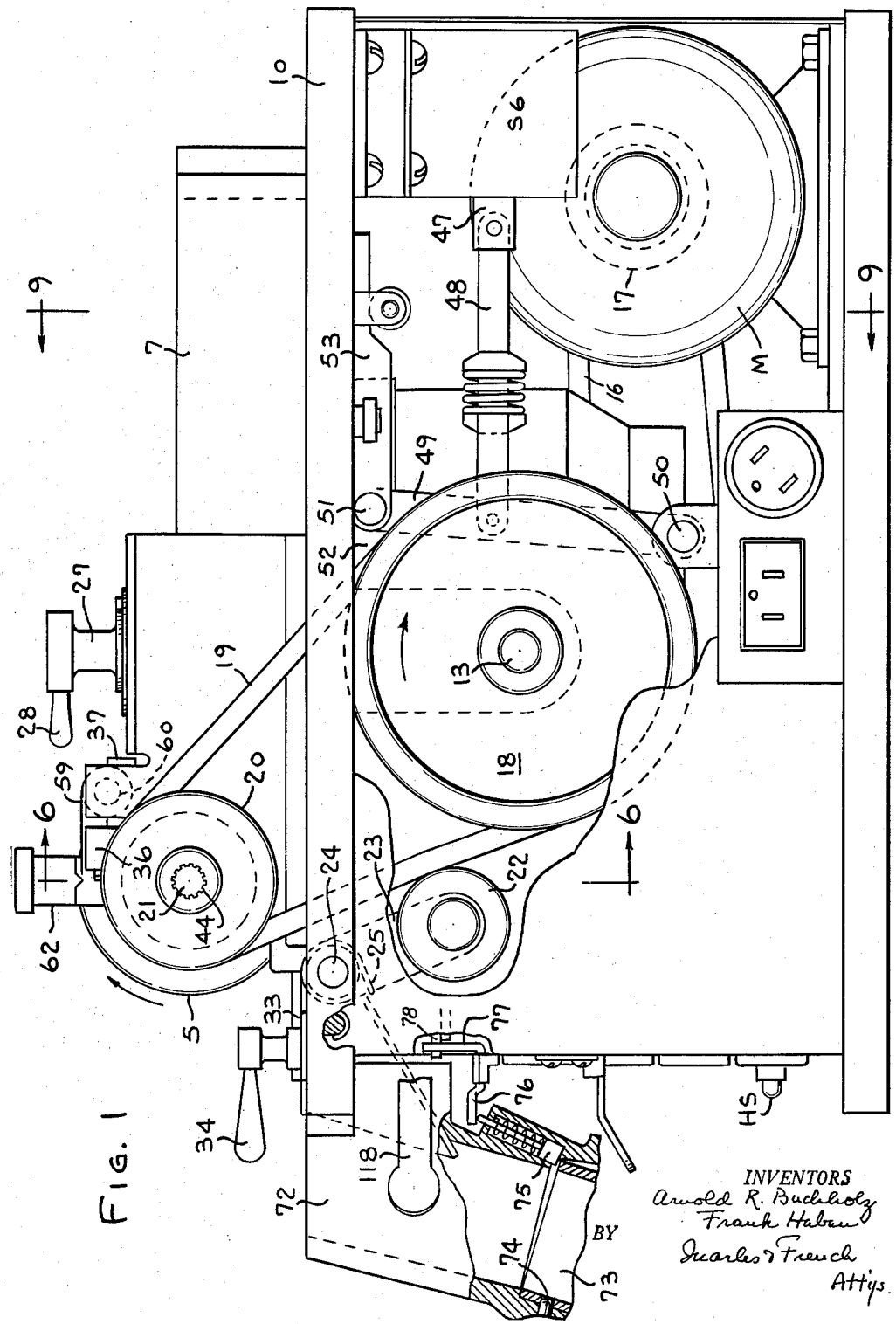
Fig. 1 is a side elevation view of a coin counting machine embodying the invention, parts being broken away.
Figure 2:
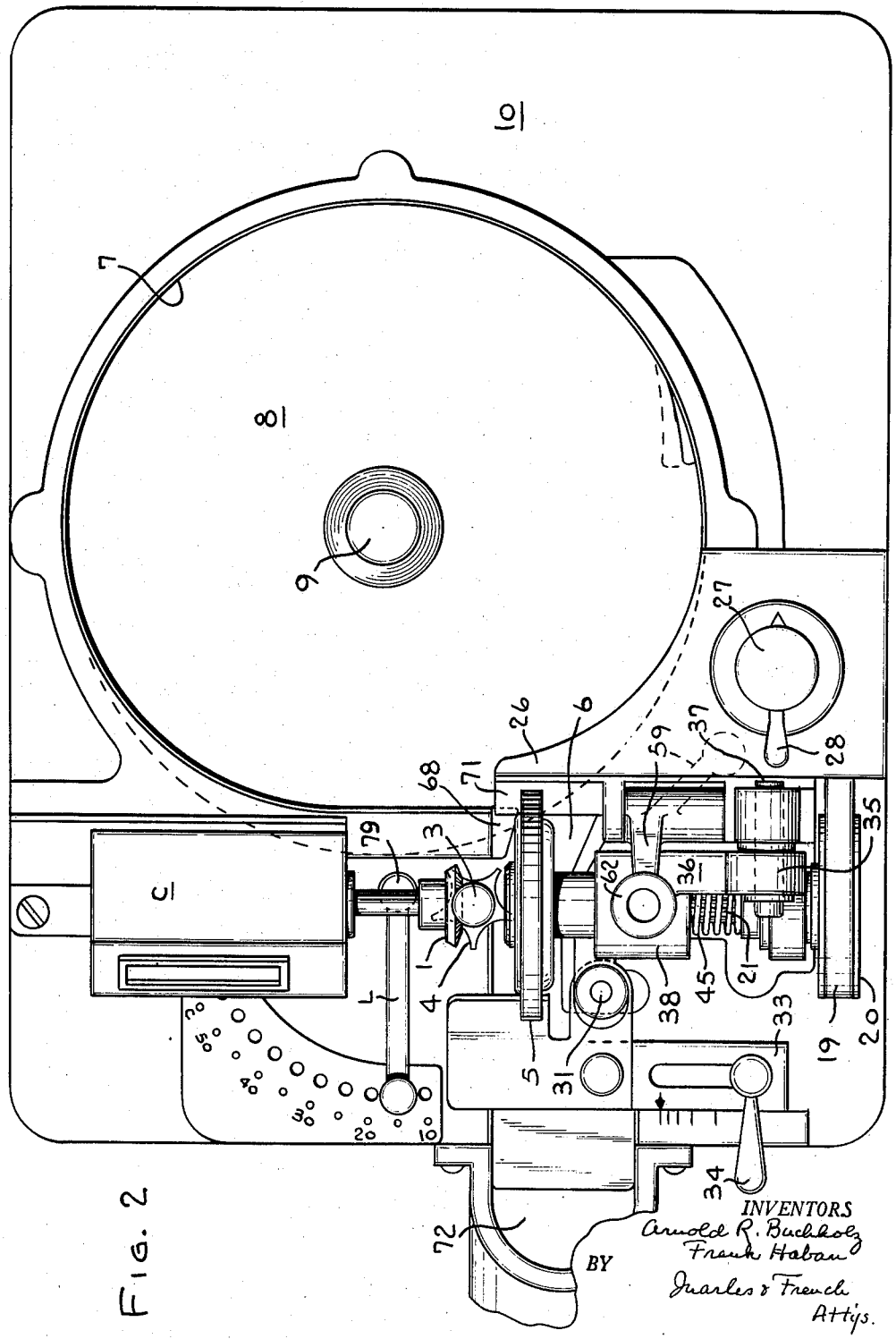
Fig. 2 is a plan view of the coin counting machine.
Figure 3:
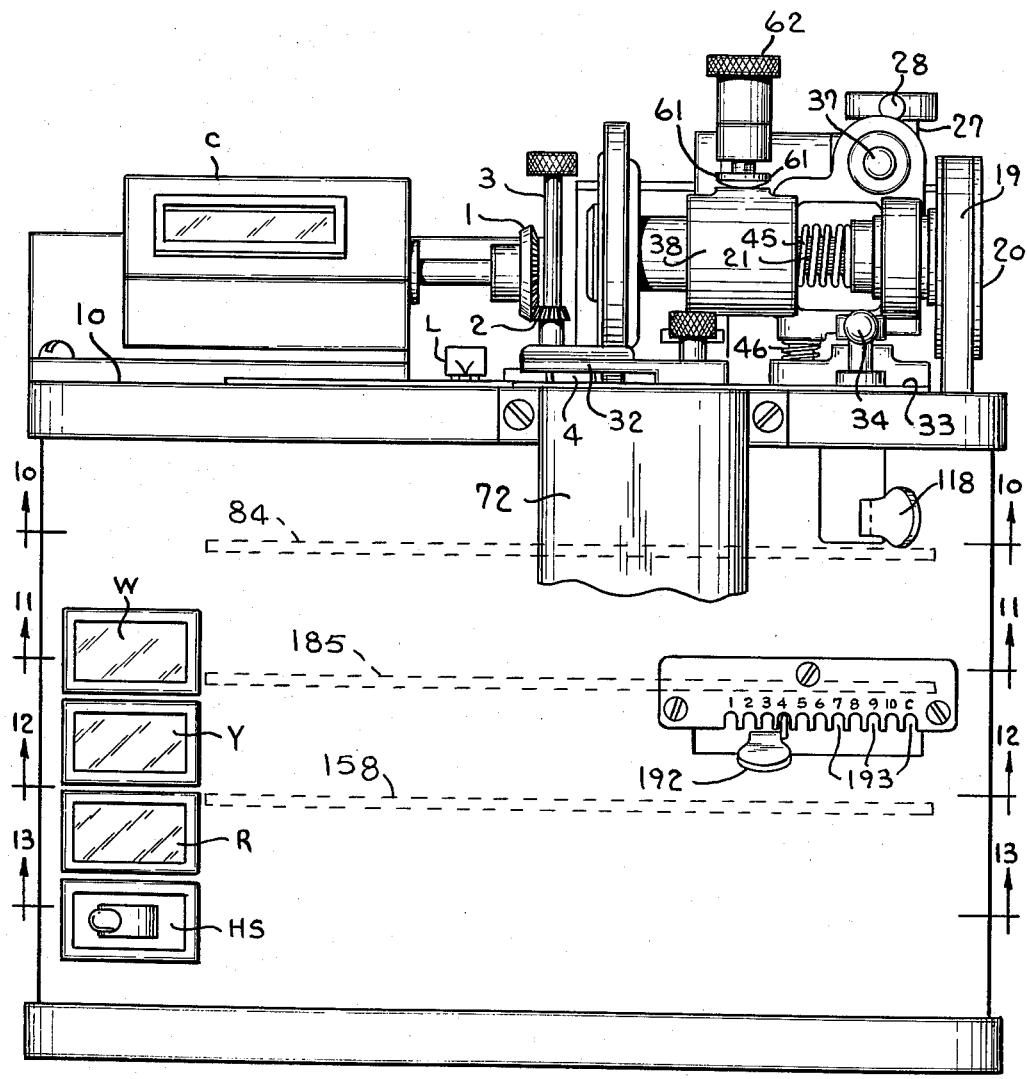
Fig. 3 is a front elevation view of the coin counting machine.
Figure 6:
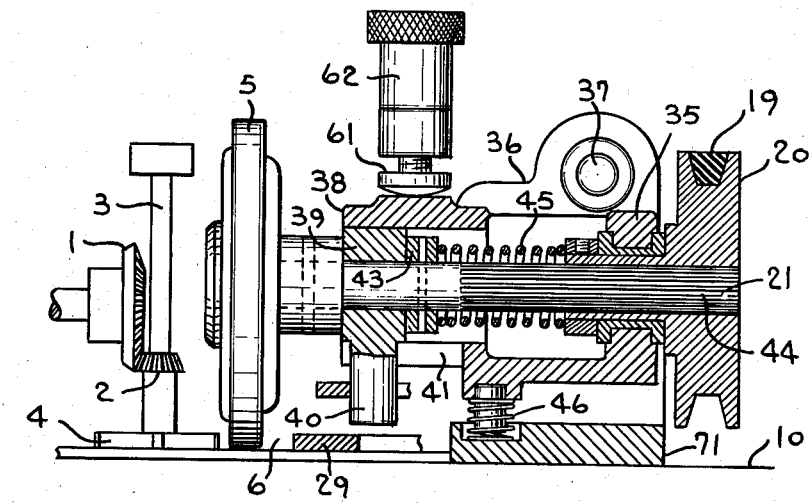
Fig. 6 is a detailed vertical sectional view taken on the line 6—6 of Fig. 1.
Figure 9:
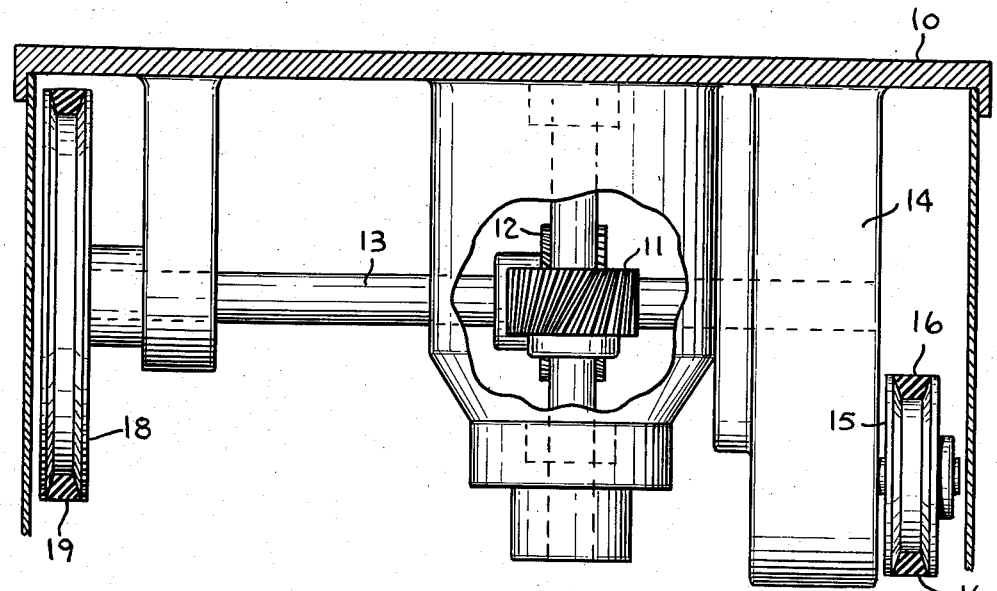
Fig. 9 is a detailed vertical sectional view taken on the line 9—9 of Fig. 1.

Referring to Figs. 2 to 4 of the drawings, as in all machines of this general type, a counter C is provided whose shaft carries a bevel gear 1 meshing with a bevel gear 2 on an upright shaft 3 carrying a coin operated star wheel 4, the coins being fed past said wheel 4 by a feed wheel 5 as they are delivered to said wheel through an adjustable exit opening 6 at one side of a hopper 7 whose bottom 8 is in the form of a disk or round plate carried by a vertically disposed shaft 9 extending through a top plate 10 and carrying a spiral gear 11 meshing with a gear 12 on the main drive shaft 13 (see Fig. 9). The drive shaft 13 is operatively connected with the output side of a gear reduction unit 14 whose input side carries a pulley 15 connected by a belt 16 to a pulley 17 on the shaft of a motor M (see Fig. 1). The drive shaft 13 also carries a pulley 18 connected by a belt 19 with a pulley 20 on the feed wheel carrying shaft 21. The belt 19 is tensioned by a roller 22 engageable therewith and carried by an arm 23 mounted to swing on a fixed stud 24 and urged to tensioned position by a spiral spring 25.

As in the prior U.S. Patent No. 2,378,828, dated June 19, 1945, to A. R. Buchholz et al., a vertically adjustable gate 26 determines the effective height of the discharge opening 6 from the hopper and is vertically adjustable by the turning of a screw shaft 27 carrying a handle 28.

Referring to Fig. 4, a gauge member 29 in the form of a lever pivoted at 30 is operatively connected by a pin 31 to a deflector plate 32 having a slotted extension 33 adapted to be locked in a settable width position by a hand clamp 34. The adjustment of the gauge member 29 determines the width of the exit opening 6 to suit the diameter of the particular denomination of coins being counted.

Referring to Figs. 2, 3, 4, and 6, the shaft 21 is mounted through its mounting in the hub of the pulley 20 in a bearing 35 in a housing member 36 pivoted on a fixed pin 37 to permit vertical swinging movement of the shaft 21. The housing member 36 also has a collar portion 38 in which another bearing 39 for the shaft 21 is slidably mounted, said bearing member provided with a pin extension 40 working in a slot 41. The feed wheel 5 is pinned to the shaft 21 and is also mounted to move lengthwise with the bearing portion 39 by interposing said bearing portion between the hub of the feed wheel and a collar 43 also pinned to the shaft. The shaft 21 has a splined connection 44 with the hub portion of the pulley 20 so that it can slide lengthwise relative thereto. The shaft 21 with its feed wheel is normally urged toward the left as viewed in Fig. 6 by a spring 45. The feed wheel 5 is normally urged to an inoperative position or rendered inoperative by a spring 46 interposed between the frame and the housing 36. The feed wheel 5 with its shaft 21 is swung down against the pressure of the spring 46 to a feeding position, rendering it operative, by mechanism more particularly shown in Fig. 5.

This mechanism includes a solenoid S6 whose plunger 47 is operatively connected by a two-part spring cushion link 48 with the intermediate portion of a lever 49 pivoted at 50 on the frame of the machine and pivotally connected at its upper end by a pin 51 to a pair of push rods 52 and 53 guided on rollers 54 and 55. The push rod 52 is provided with a wedge surface 56 engageable with a roller 57 on a thrust member 58 slideably mounted in the frame of the machine and in thrust engagement with one arm of a bell crank lever 59 pivoted at 60. The other arm of the bell crank lever has a contact screw 61 adjustably mounted thereon and engageable with the portion 38 of the housing 36, the screw 61 having a settable adjustable connection with the lever 59 by the turning of a manually adjustable collar 62 so that the adjustment of the screw 61 compensates for wear of the rubber surface of the feed wheel 5. Energization of the solenoid S6 causes the plunger 47 operating through the link 48 and the lever 49 to move push rod 52 toward the right, thereby pushing upwardly through roller 57 and its rod 58 on the lower arm of the lever 59 and thus swinging the screw carrying arm of said lever downwardly and hence the housing 36 for the feed wheel downwardly, thereby carrying the feed wheel 5 and its shaft 21 downwardly to bring the feed wheel into feeding engagement with the coins. On deenergization of the solenoid a spring 63 connected to the lever 49 acts to bring the push rod 52 back to the position shown in dotted lines in Fig. 5 and the other parts to a position which permits the spring 46 to act on the housing 36 to move the feed wheel 5 upwardly into its inoperative position. Push rod 53 being connected to the lever 49 is moved at the same time as the push rod 52 and as shown in Fig. 4 has a wedge projection 64 adapted to engage a roller 65 on a coin deflector member 66 working in a slot in the hopper adjacent its bottom and pivotally mounted on a pin 67 on the outside of the hopper housing. When the feed wheel is in operative position as shown in Figs. 5 and 4, the deflector member 66 is in the position shown in Fig. 4 being urged to this position by the coins as they travel with and relative to the bottom 8. When, however, the feed wheel 5 is moved to its inoperative position by the spring 46, the push rod 53 is moved toward the left as viewed in Fig. 4, and in doing so its wedge projection 64 engages the roller 65 and swings the deflector member 66 outwardly to the dotted line position. When the deflector member 66 is in its full line position, it projects to some extent from the outer side wall of the hopper so that as the coins are carried around by the rotating bottom plate 8, they will be deflected by this member 66 away from the outer wall of the hopper at this side of the machine and will tend to move free of this side wall as they are carried by the plate to the exit opening 6. When the deflector member 66 is moved to its dotted line position, then the coins will be still further deflected away from the side wall and also to a great extent from moving in a direct line to the opening 6 and will tend to be moved away from this opening and be carried along past a fixed plate 68 that forms part of the side wall of the exit opening adjacent the star wheel 4.

Usually the feed wheel, such as the feed wheel 5, is fixedly positioned relative to the exit opening so that it always comes down into coin engaging position in the samea rea of the exit opening, and as a result it engages the different denominations of coins at different points in their area, and because of this has a tendency to twist the coin as it is carried by the feed wheel past the star wheel 4. This twisting of the coin relative to the feed wheel acts to produce a wear on the rubber tired surface of the wheel since the twisting action on the coins may be greater than a five percent twist which would be within the flexing point of the rubber without exceeding its shear point. As a consequence, in the present invention the feed wheel 5 is adapted to be shifted lengthwise of its bearings so as to bring the center of the wheel into the approximate center of the coin of any denomination that is being fed past the star wheel 4 to prevent the wear producing twisting action. For this purpose the pin 40 on the collar 39 is adapted to engage a lever 69 pivoted on the pin 70 carried by a block 71 mounted on the top plate 10, the lever 69 being operatively connected at its other end to the pin 31 carried by the lever 29 so that the levers 69 and 29 move together, but the lever 69 only goes half the distance of the lever 29 when the gauge plate including the member 33 is adjusted. Thus since the lever 69 engages the pin 40 of the bearing member 39, adjustment of the levers 29 and 69 will move the bearing 39 and consequently the feed wheel 5 lengthwise relative to the exit opening 6 in such a ratio as to bring the center of the wheel 5 into a central plane of the width of the opening 6 that has been predetermined by the adjustment of the lever 29 through the movement of the plates 32 and 33 by the operator, it being noted that the spring 45 urges the pin 40 in contact with the lever 69 so that when said lever and its associated lever 29 move, the wheel will also be moved transversely of the exit opening 6.

The feed wheel 5 when in operative position acts to carry the coins of any selected denomination, one at a time, into contact with and past the star wheel 4 through a discharge chute 72 which leads downwardly from the front end of the machine and is operatively connected as in prior patents such as the U.S. Patent No. 2,669,997, of February 23, 1954, to E. W. Quirk and A. R. Buchholz, to a discharge tube 73 which is suitably tiltably mounted upon a pin 74 so that it may be moved to engage a spring pressed plunger 75 that acts on a crank member 76 which is suitably pivoted in the frame of the machine and has an arm 77 engageable with a push bar 78 which as hereinafter described is used to reset the predetermined count mechanism at the end of each packaging operation. As the coins from the hopper are carried past the star wheel 4 by the feed wheel 5, the star wheel 4 is advanced one tooth for each coin, and through the bevelled gears 1 and 2 the counter C records the passage of each coin.

In order to provide for automatic operation of the machine to count out batches of coins of different numbers for any denomination, we have provided a predetermined count mechanism which permits successive step by step movements of the star wheel 4 until the desired predetermined number of coins have been fed past said wheel by the feed wheel 5 and then sets the necessary mechanism in motion to deenergize the solenoid S6 and thereby raise the feed wheel 5 from its coin feeding position to stop further feed of the coins. Also in addition to the control of predetermined counts from ten to fifty coins, we have provided predetermined count mechanism associated with this lesser predetermined count mechanism and also independently operable relative thereto to control predetermined counts of a thousand coins.

For the lesser predetermined counts reference is here made to Figs. 2, 10, 11, and 14 to 19. A settable lever L mounted on the top of the machine as shown in Fig. 2 is connected to an angularly adjustable shaft 79 carrying an arm 80 engageable with a pin 81 on the ratchet wheel 82, said pin extending through an arcuate slot 83 in a frame plate 84. The ratchet wheel 82 is turned in one direction by a spring 85 and in the opposite direction by intermittent engagement of a pair of pins 86 and 87 mounted on a disk 88 secured to a shaft 89 that also has a ratchet wheel 90 mounted on it.

Figure 10:
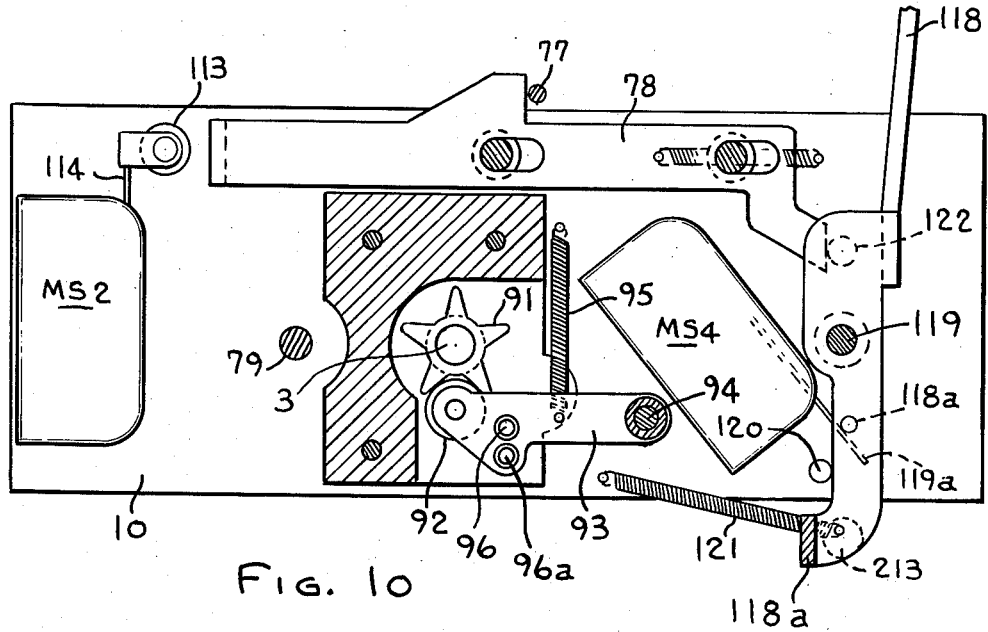
Fig. 10 is a detailed horizontal sectional view taken on the line 10—10 of Fig. 3.

Referring to Fig. 10, the shaft 3 that carries the coin engaged star wheel 4 also carries a star wheel 91 similar to the five point star wheel 4 and engageable with a roller 92 on a lever 93 pivoted at 94 on the frame of the machine, said lever being held in operative engagement with the wheel 91 by a spring 95. The lever 93 has two depending pins 96 and 96a. As shown in Fig. 14, the pin 96 has a pawl 97 pivotally mounted thereon and normally urged by a spring 98 anchored to the pin 96a into operative position with the ratchet wheel 90 so that as the star wheels 4 and 91 revolve under the action of a coin being carried past the wheel 4 by the feed wheel, the lever 93 makes a complete oscillation for each coin. This oscillation is transmitted through the pawl 97 to the ratchet wheel 90 to advance said wheel 90 a single tooth and thus advance the shaft 89 carrying the pins 86, 87 a tenth of a revolution so that for a full revolution the pins 86 and 87 advance the ratchet wheel 82 through two spaces, or for every five coins delivered by the feed wheel the ratchet wheel 82 is advanced one tooth.

Figure 11:
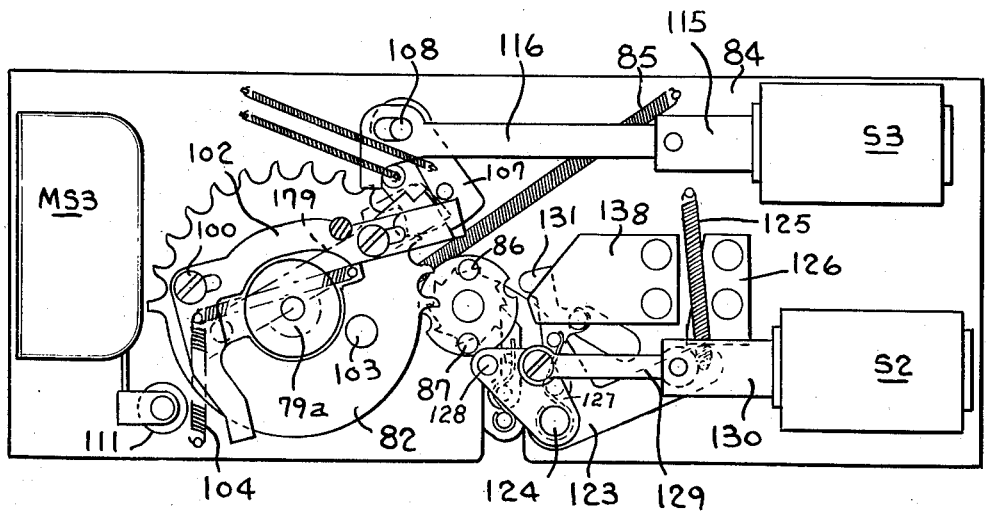
Fig. 11 is a detailed horizontal sectional view taken on the line 11—11 of Fig. 3.

In Fig. 11 of the drawings through the setting of the lever L the ratchet wheel 82 has been turned against the tension of the spring 85 so as to set the wheel for the counting out of fifty coins. The ratchet wheel 82 is pivoted on a pivot 79a mounted on plate 84 and also has a lever or member 99 pivoted thereon. The member 99 carries pins 100 and 101 and has another lever or shiftable member 102 mounted on it and slotted to receive the shanks of said pins. These levers 99 and 102 while pivoted on the pivot 79 are free of the ratchet wheel 82, but the member 99 is adapted near the end of a predetermined count to be moved by the movement of the ratchet wheel 82 through contact of a pin 103 with a part thereof. Normally the members 99 and 102 are held in an inoperative set position by springs 104 and 105. Spring 104 is anchored at one end to the lever 102 and at its other to the plate 84, but since the member 102 is mounted on the member 99, this spring acts to swing both members about the pivot 79a counterclockwise, which brings the outer end of the member 102 into contact with a stop pin 106 on a pawl 107 pivoted at 108 on plate 84 to hold the shiftable member 102 in an inoperative position. Spring 105 is anchored at one end to the member 99 and at its other end to the point of anchorage of the spring 104 with the member 102 and normally acts to move the member 102 toward the right as viewed in Fig. 14. The ratchet is normally held against retrograde movement by a spring pressed hold down pawl 109 pivoted on the plate 84 and also pivoted on the pin 108. The member 99 has a notched end 110 that extends out beyond the plane of the ratchet wheel and is adapted in one position of the mechanism to be engaged by the pawl 107 (see Fig. 15).

Near the end of every predetermined unit count, such as ten to fifty in increments of five, the notched portion 110 is engaged by the pawl 107 as shown in Fig. 15. The position of the parts at the beginning of the preset count of fifty is shown in Fig. 11, showing that the stop pin 103 has a considerable arc of travel before it reaches the point shown in Fig. 14 where the ratchet wheel 82 has one more notch to go before completing the predetermined count, which would mean the passage of five more coins past the feed wheel. During this period the stop 103 engages the member 99 and turns it and the member 102 from the position shown in Fig. 14 to the position shown in Fig. 15. Because of the mounting of the member 102 on the member 99, both of these members are swung about the pivot 79a and swung to a position to bring the arm 102a of the member 102 in operative position in line with a roller 111 on a switch operating arm 112 controlling switch MS3 which controls solenoid S6. At the same time the swinging of the member 102 moves it away from inoperative position engaging the stop pin 106 and brings it into its operative position to be engaged by either the pin 86 or 87 so that as the disk 88 is being turned to complete the final count, the pin 86 moving in a counterclockwise direction pushes on the front end of the member 102 so as to move the same from the full line position shown in Fig. 15 to its dotted line position and bring it into operative engagement with the roller 111 to operate the switch MS3. The angular position of the pin 103 changes after the forty-fifth coin has passed by the feed wheel from the position shown in Fig. 14 to the position shown in Fig. 15. This pin reaches the position shown in Fig. 15 after the forty-eighth coin and remains substantially in this position while the forty-ninth and fiftieth coins are being fed through the machine. As shown in Fig. 15 the pin 86 is in the position during which the forty-ninth coin is passing through the machine, and on the passage of the fiftieth coin said pin 86 moves to the dotted line position with the consequent movement as above explained of the member 102 to its dotted line position. At the time that the forty-eighth coin is passing through the exit opening and the member 99 has been swung to the position shown in Fig. 15 the latch or pawl 107 has moved down to engage with the notch 110 of member 99.

As hereinafter explained, operation of the switch MS3 acts to deenergize the solenoid S6 so that the feed wheel 5 can be swung to its inoperative position to stop further count of the coins. This stops the machine against further coin dispensing operation until the operator has removed the package containing the predetermined number of counted coins from its position in the coin tube 73 and replaced it with an empty package. In replacing it with an empty package the tube 73 is tilted as previously described and operates through the mechanism previously described to move the push rod 78 (Figs. 1 and 10) to a position where it engages a roller 113 on an actuator 114 for a switch MS2 which as hereinafter explained controls solenoid S3. The plunger 115 (Figs. 11 and 16) of solenoid S3 is connected to a hook member 116 having a slot 116a guided by the pivot pin 108 and having its hooked end 116b engageable with a pin 117 on the hold down pawl 109 so that on the closing of switch MS2 to effect energization of solenoid S3 the hook member 116 is pulled toward the right as viewed in Fig. 16 to engage the pin 117 and move the holding pawl 109 out of engagement with a tooth of the ratchet 82 from the position shown in Fig. 15 to the release position shown in Fig. 16. During this movement the pin 117 also engages the pawl 107 and acts to release this pawl from its locking engagement with the notch 110 and thereby permits the predetermined counter mechanism including the ratchet wheel 82 to be moved back to its initial position by the spring 85, thus resetting the counter for another run of a predetermined number of coins. At the same time that the spring 85 turns the ratchet wheel 82 to its initial position, the springs 104 and 105 reset the members 99 and 102 to the position shown in Fig. 11. The cycle is then ready to be repeated, it being understood that the above description is representative of a typical cycle of the machine for one predetermined count of fifty coins. If the predetermined count should be one ending in five instead of zero, then instead of the pin 86 acting to cause the actuation of the switch MS3, the pin 87 would come into play.

There are times in the running of these coin counting machines in the counting and packaging of a batch of coins that the coin source may become depleted before the predetermined number of coins can be furnished to the last package, and under those conditions in order either to normalize the machine by bringing the ratchet wheel 82 back to its zero position or in case under these conditions the machine is to be set to count another denomination of coins, it has been necessary to run out those coins making up the remainder of the predetermined count so as to bring the machine back to zero. By the present invention this running out of the coins is eliminated since provision has been made for automatically bringing the predetermined count mechanism to a zero position simply by the manual operation of a lever by the operator. In the present instance this hand lever, shown in Fig. 10, is designated by the numeral 118 and pivoted at 119 on plate 84 (not shown in Fig. 10) and normally held against a stop pin 120 by a spring 121 but adapted to be moved by the operator so that a pin 122 thereon engages the push rod 78 to move said push rod to engage roller 113 of actuator 114 to operate switch MS2 which as we have seen before operates solenoid S3 to permit the return of the ratchet wheel 82 to its initial position. Since, however, the count has not been completed, the pins 86 and 87 on the disk 88 may not be in the position of the start of a count such as shown in Fig. 11 but may be in a position where they would interfere with the proper start of the count so that the first step in getting them to a normal counting position is to move the disk 88 with its pins clear of the wheel 82. This is accomplished by mounting the shaft 89 on one arm of a lever 123 pivoted at 124 on a frame plate 84 and normally urged to bring the assembly including shaft 89 to an operative position with the ratchet wheel 82 by a spring 125, in which position the lower arm of the lever engages a stop plate 126. Also pivoted on pin 124 is a triangular lever 127 shown in full in Fig. 11 and carrying a pin 128 shown in said figure and also indicated in Figs. 14 to 19. The pin 128 is in a position to engage the upper arm of lever 123 and also the free end of the pawl 97 so that movement of the pin 128 toward the right as viewed in any of the above-mentioned figures will cause the outward swinging movement of the upper end of the lever 123 to the position shown in Fig. 16. The movement of the pin is effected through the swinging movement of the lever 127 by its connection through a link 129 with the plunger 130 of a solenoid S2.

Solenoid S2 is controlled by a circuit including switch MS4 shown in Fig. 10, which switch is under the control of the operator's movement of the hand lever 118 by engagement of a pin 118a with the actuator 119a for said switch. Energization of the solenoid S2 then moves the parts operatively connected with the solenoid plunger 130 to the general position shown in Fig. 16 although the pins 86 and 87 may not be in their proper position for re-register with the ratchet wheel 82. If they are not, then a registering means is provided to bring them to this position. This registering means includes a finger 131 pivoted on a pin 132 carried by the lever 123 and normally biased toward the disk 88 by a spring 133 but limited in its movement by a pin 134 operating in a fixed slot 135 in plate 84, said finger having a circular end adapted in the registering position of the parts to engage in either one of similarly formed notches 136 in the disk 88, said notches being diametrically disposed and arranged in that part of the disk 88 between the pins 86 and 87. The spring 133 normally urges the finger 131 at all times to swing in a direction toward the disk 88, and depending upon the position in which the disk finds itself in a period intermediate a predetermined count, the finger 131 will either ride on the periphery of the disk 88 or be free to drop into one of the notches 136. If it happens that the pins 86 and 87 on their release from the ratchet wheel 82 are in their proper position, the finger 131 will engage and hold the disk 88 in its proper position for a return to registry with the ratchet wheel 82. If, however, they are not in such a position but are, for example, in the position shown in Fig. 17, then the first swinging part of the swinging movement of the lever 123 will bring the disk 88 into contact with the finger 131 and also bring one of the pins 86 or 87 into contact with a wedge surface 137 on a fixed plate 138 so that on continued movement the pin 86 rides up on this surface which by its wedge effect acts to swing the disk 88 in a counterclockwise direction until the pin 87 contacts a lower face 139 of the plate 138, at which time the disk 88 has then been turned so that one of the notches 136 is in a position to be engaged by the end of the finger 131 so as to temporarily lock the disk 88 and its pins 86 or 87 in the desired operating position so that when the solenoid S2 is deenergized, the spring 125 is free to act on the lever 123 to return the said assembly back to its initial operating position as shown in Figs. 11 and 14.

It is to be noted that the ratchet wheel 90 and hence the shaft 89 is held against retrograde movement by a leaf spring 140 operatively mounted between pins 140a, 140b, and 140c, which spring, however, is released from the ratchet 90 when the disk 88 with its associated pins 87 and 86 is moved out to a position for resetting. It is to be noted that the pins 86 and 87 could be in an initial position at an intermediate count of the predetermined count such that one of these pins would on the swinging of the lever 123 first engage the surface 139, in which instance instead of the continued movement of the lever 123 toward the right as viewed in Figs. 17 to 19 acting to turn the disk 88 in a counterclockwise direction, said disk might turn in a clockwise direction until the pins assume the same position that they are shown in Fig. 19 since it does not make any difference as far as the operation of the machine is concerned whether the pin 86 or 87 is the upper pin, that is, upper as oriented in the drawings.

It is to be noted that after the finger 131 has moved into its registering position relative to one of the notches 136, it continues to be held in this position and moves with the other parts of the assembly in this position until the movement of the lever 123 moves the lever 127 back to its initial position (Fig. 11) and its pin 128 out from engagement with the pawl 97 which is then free to snap into locking engagment with the ratchet wheel 90 before the finger 131 is released from the notch 136 as shown in released positions in Figs. 14 and 15. Thus by the operator's simple movement of the lever 118 the drive mechanism for the ratchet wheel 82 can be automatically reset to a zero position even though the ratchet wheel 82 has been stopped either because of coin depletion or because of coin denomination change in a position in which it has not completed its count.

It is sometimes desirable to be able to count not only a thousand coins but to provide for counting in multiple thousands, and for this purpose the present invention has an automatically resettable thousands count ratchet wheel 141 loosely pivoted on a shaft 142 and adapted to be moved in one direction by a spring 143 and in the other direction by a pin 144 successively engageable with the teeth of the ratchet wheel after each fifty coins have been counted, the pin being carried on a ten pointed star wheel 145 having a holding pawl 146 engageable therewith under the action of a spring 147 (see Figs. 12, 20, and 26). The star wheel 145 is mounted on a shaft 148 that is pivotally mounted in a supporting lever 149 pivoted on the machine frame at 150, said shaft 148 carrying a transfer ratchet wheel 151 which is in the path of the pins 86 and 87 if the machine is set for counting thousands, it being noted that the shafts 89 and 148 are not coaxial but one is angularly disposed relative to the other so that the swinging of lever 149 can effect an operative association of the ratchet 151 with the pins 86 and 87 of the disk 88, it being noted that for every revolution of the disk 88 the ratchet wheel 151 will be advanced two teeth by the successive engagement of the pins 86 and 87 with the teeth of said wheel. Since the ratchet 151 and the star wheel 145 are pinned together, the shaft 148 makes one revolution for the passage of every fifty coins past the exit opening 6, and as there are twenty operative teeth on the ratchet wheel 141, twenty revolutions of the shaft 148 will cause a register of a thousand coins through the successive movements of the ratchet wheel 141.

A holding pawl 152 is pivotally mounted at 153 on the machine frame and normally urged into operative engagement with the wheel 141 by a spring 154. The pawl 152 carries a pin 155 that is engaged by a lever 156 (see Figs. 13, 29) to release it from wheel 141 after a thousand count. Lever 156 is pivoted at 157 on a frame plate 158 and is adapted to be engaged by a pin 159 (Fig. 20) on a pawl 160 pivoted at 161 and normally urged by a spring 162 against a stop pin 163 on a fixed frame plate 164. For releasing the pawl 152 at the end of a thousand count, the plunger 165 of a solenoid S4 is moved inwardly, putting tension on a spring 166, one arm of which engages a pin 167 on the lever 156, moving it into contact with the pin 155 so as to swing the pawl 152 out of holding engagement with the ratchet wheel 141 and at the same time acting on the pin 159 to swing the pawl 160 inwardly. The pin 167 works in a slot 168 in the plate 158 and under the action of the solenoid S4, at the end of a thousand count, moves up to engagement with a releasable stop lever 169 pivoted at 170 on said plate and operatively connected with the plunger 171 of a solenoid S5.

As hereinafter described in connection with the circuit diagram, solenoid S4 is energized at the end of every thousand count, but if the machine is set for counting in multiple thousands, then after the end of the multiple count solenoid S5 is energized under the control of the operator to move stop lever 169 out of the path of pin 167 to permit the lever 156 to move over to a position beyond its release position and to the position indicated by the second dotted line 172 in Fig. 29.

Referring to Fig. 13, solenoid S4 is under the control of a switch MS8 mounted on a pivoted lever 173 and provided with actuators 8a and 8b cooperating with fixed stops 8c and 8d. Switch MS8 is tilted to bring its actuators into alternate cooperative action with their stops by the alternate engagement of a pin 174 on the ratchet wheel 141 with projections 175 and 176 on the lever 173. Thus at the end of a thousand count, pin 174 engages the projection 175 to swing switch MS8 counterclockwise to bring actuator 8a into contact with stop 8c to close the circuit to solenoid S4 which acts through lever 156 and pin 155 as previously explained to release the pawl 152. On the release of pawl 152, the spring 143 acts to return the ratchet wheel 141 to its initial position and in swinging back the pin 174 thereon engages the projection 176 to swing switch MS8 back to its initial position to bring its actuator 8b into contact with stop 8d as shown in Fig. 13 to open the circuit to solenoid S4. Thus the thousand count predetermining mechanism is automatically reset to its initial position after every count of a thousand coins.

At the end of a thousand count the pin 174 (see Fig. 20) also engages and swings a two-part lever 177 and 177a, whose parts are operatively connected together by a spring 178 to bring the part 177a into contact with the pin 100 on the shiftable lever or member 102 and acting thereon moves the members 102 and 99 in the same way as the pin 103 on the ratchet wheel 82 moves these members to release lever 102 from pin 106 and move them to the position shown in Fig. 15. The lever 177 and 117a is returned to its initial position, shown in Fig. 12, against a stop pin 177b when the pin 100 on the lever 99 is returned to its initial position, shown in Fig. 14, by the spring 104.

With the parts in the position shown in Fig. 15, one of the pins 86 or 87 is then in a position where it will engage the shiftable member 102 to move it to the dotted line position to engage roller 111 of switch actuator 112 to open switch MS3 to deenergize the solenoid S6 and thus permit the spring 46 to raise the feed wheel 5 at the end of a thousand count. Thus the shiftable member 102 is adapted to control the movement of the feed wheel to its inoperative position at the end of either a lesser count of coins or a thousand count of coins.

In connection with the thousand count mechanism, the machine is designed to permit counting in thousands while packaging in multiple units thereof, counting in thousands while packaging in lesser units not multiples of a thousand, and counting in one thousand or multiples of a thousand alone, as in bagging operations.

For accomplishing the above purposes, a lever 179 is freely pivotally mounted on a stud 180 mounted on the plate 185 and axially alined with the shaft 79 and is shown in Figs. 23 to 25 and 28. It is limited in one position by a stop pin 181, in which position it abuts the pin 106 on latching pawl 107 to hold this pawl out of engagement with the notch 110 on the lever 99. It is urged to this position by a spring 182 and is adapted to be released from the pin 106 by the pin 103 engaging a pin 183 on said lever 179 when the wheel 82 comes into its final position at the end of every predetermined unit or lesser count.

For counting in thousands while packaging in multiple lesser units thereof, the lever 179 is in the position shown in Fig. 23 during the count of each lesser count, but near the end of this predetermined lesser or unit count the pin 103 on wheel 82 moves into contact with pin 183 to swing lever 179 out of engagement with the pin 106 and into its release position shown in Fig. 24 so that at the end of this lesser count the pawl 107 can engage the notch 110 of lever 99 to hold the levers 99 and 102 in the position shown while one of the pins 86 or 87 is moved to complete the count and actuate lever 102 to operate switch MS3 and through a relay hereinafter described deenergize solenoid S6 to stop the coin feed.

For counting in thosuands while packaging in lesser units not a multiple of a thousand, the lever 179 stays in the position shown in Fig. 25 until at the end of the selected lesser non-multiple count the pin 103 moves said lever 179 out of contact with the pin 106. However, since the thousand count is not a multiple of the unit count and must be permitted to reset itself, the lever 179 in holding out the pawl 107 while the pin 103 is inactive permits the operation of the members 99 and 102 at the end of a thousand count without latching them in the switch operating position shown in Fig. 15. Thus while the lever 179 is in its latching position with the pawl 107, the resetting of the thousand count is effected without interfering with the continuance to completion of the lesser count. As an example, if you are packaging in lesser amounts of thirty coins at the end of the packaging of nine hundred ninety coins, a multiple of thirty, the feed wheel 5 is raised at the end of this count, but ten more coins are required to have the thousand count register so that when the next package is placed in the coin tube 73, the machine will deliver ten coins to this package and stop at the end of a count of the thousand count, reset the thousand count, and will then continue to deliver the next twenty additional coins before it is again stopped.

Before considering the counting in thousands alone, the mechanism that permits the counting of either one or more thousands before the machine is stopped will be considered. For this purpose and referring to Figs. 12, 20, and 21, a settable rack bar 184 is slideably mounted on a frame plate 185 by pin and slot connections 186, said bar having teeth 187, some of which are adapted to engage with a pawl 188 pivoted at 189 in plate 185 and held by a spring 190 in engagement with the bar 184. A manually settable lever 191 is adapted to be manually moved to engage the bar 184 to set the same to the desired position. For moving the lever 191, it has a detent type operating end 192 movable transversely relative thereto and cooperating with setting notches 193 in the front face of the machine as shown in Fig. 3, the main part of the lever being pivoted at 194 to the plate 185, a return spring 195 acting on the rack 184 to hold it in engagement with the lever 191 during setting. In its set position the pawl 188 holds the bar 184 in the position in which it has been set. This bar 184 by its adjustment is held in any one of its adjusted positions by the pawl 188. It is moved one tooth at a time for every thousand count movement of the ratchet wheel 141 by engagement of a pawl 196 pivotally mounted at 197 on the wheel 141 and urged into engagement with the rack teeth 187 by a spring 198 so that for each counting cycle of the ratchet wheel 141 the pawl 196 advances the bar 184 one tooth, and depending on the initial adjustment of this bar, it will contact a roller 199 sooner or later to operate switch actuator 200 so as to actuate switch structure MS1 which acts to energize solenoid S5, previously referred to, which pulls in the plunger 171 so as to swing the stop lever 169 out of its stopping position to the dotted line position shown in Fig. 29 and thereby permit the lever 156 to swing beyond its first dotted line position to its second dotted line position and move the pawl 152 through engagement with the pin 155 to its outer dotted line position 172 shown in Fig. 20. As this pawl 152 moves to its outer dotted line position, a projection 201 thereon swings in to engage a pin 202 on the pawl 188 to release this pawl so that at the end of a predetermined thousand count the rack 184 may move back to its initial position.

In making a count of one thousand, switch structure MS1 is actuated by the rack to energize solenoid S5 when a count of 995 has been reached. At this time ratchet wheel 141 has been advanced by pin 144 to bring pin 174 into operative engagement with lever 177 and 177a to operate pin 100 to bring lever 99 and 102 to switch operating position and also bring switch MS8 to a closed position. Then as a count of a thosuand is reached, one of the pins 86 or 87 will move the lever 102 to operate the switch MS3 in the manner previously described to deenergize solenoid S6 to stop the drive of the feed wheel 5. As hereinafter explained, operation of switch structure MS1 acts in conjunction with switch MS3 to open the motor circuit so that in counting predetermined thousands both the feed wheel and the motor are inoperative at the end of the preselected thousand count.

For counting in units of one thousand alone, the lever L is moved to the continuous count position C which through lever 80 and pin 81 moves the ratchet wheel 82 to an inoperative position relative to its driver pins 86 and 87, that is, to an angular position in which these pins cannot engage the teeth of the wheel 82. Also the settable detent 192 is moved to the "one position" of Fig. 3, thereby moving the lever 191 and by it the rack bar 184 to a position where said bar can only be advanced one tooth before contacting roller 199 to move actuator 200 to operate switch structure MS1 followed by the actuation of switch MS8 and MS3 in the manner previously described to deenergize solenoid S6 to stop the drive of the feed wheel 5 and stop the motor M.

For counting in units of more than one thousand, the lever L is also moved to the continuous count position to incapacitate the lesser predetermined count mechanism, and the detent 192 is moved to the particular thousands number it is desired to count, that is, to any one of the positions two through ten of Fig. 3. Setting of the detent 192 as previously noted determines the position of the rack bar before it moves to a position for registering the final thousands of the multiple thousand count. Under multiple thousand count conditions during the thousand count the lever 179 is used to hold the pawl 107 out of engagement with the notch 110 and also continues to hold this pawl out in the same way as shown in Fig. 25 while the members 99 and 102 are operated by the pins 86 and 87 to actuate the switch MS3 at the end of any intermediate thousand count so that it is not necessary for the operator to release the pawl 107 for each such intermediate thousand count by actuating the coin discharge tube 73 or lever 118. Consequently, for example, with the machine set for counting in multiples of four thousand the rack bar 184 is shown in its initial position in Fig. 12 and in the position after one thousand has been counted in Figs. 20 and 21. This rack bar has been advanced one thousand, but at the end of the four thousand count the lever 179 is still in the position shown in Fig. 25 and it continues to be held in this position, but on the final thousand not only is the switch MS3 operated but the rack bar 184 operates the switch structure MS1 so that the operation of both of these switches will as hereinafter explained stop the drive of the said wheel and also stop the motor.

For making a continuous count of coins both of the predetermined count mechanisms are rendered inoperative. The lesser predetermined count mechanism is rendered inoperative by shifting the lever L to the designation C which as noted above acts to disengage the pins 86 and 87 from the teeth of the ratchet 82. The thousand count mechanism is rendered inoperative by shifting the drive pin 144 on the star wheel 145 out of operative engagement with the teeth of the ratchet wheel 141, and also at the same time since the ratchet wheel 151 is mounted on the shaft 148, it is moved out of operative association with the pins 86 and 87.

Referring to Figs. 20, 21, and 26, it has been noted that the shaft 148 for star wheel 145 is pivotally mounted on a lever 149 pivoted on the machine frame at 150. Swinging of the lever 149 from the thousand count operating position shown in Fig. 20 to the position shown in Fig. 21 acts to move the pin 144 out of engagement with the ratchet wheel 141 and also acts to move the ratchet wheel 151 out of operative engagement with the pins 86 and 87.

Referring to Figs. 12, 13, 20 to 22, and 27, the detent 192 when set by the operator on continuous count acts to move the lever 191 to a position where it engages the actuator 203 of switch MS5 (Fig. 40). This switch is arranged in circuit as hereinafter described with solenoid S1 so that actuation of switch MS5 energizes solenoid S1 whose plunger 204 is operatively connected by a pin 205 with a lever 206 pivoted at 207 on the frame plate 158. Lever 206 is adapted to contact pin 208 on the lever 149 so that energization of solenoid S1 acts through plunger 204 to shift lever 206 in a counterclockwise direction and through pin 208 shift lever 149 from the position shown in Fig. 20 to the position shown in Fig. 21, thereby rendering the thousands count predetermined mechanism inoperative. The lever 149 is normally moved to its operative position shown in Fig. 20 by the spring 209 against a stop pin 210 and in addition to the solenoid S1 is also under the control of the operator through his actuation of the lever 118. For this latter purpose the lever 149 carries a pin 211 having a lost motion connection with a link 212 by its working in a slot 212a, said link 212 being operatively connected at its other end by a pin 213 with a link 214 pivoted at 215 on the plate 185. The pin 213 has an extension indicated in dotted lines in Fig. 10 that is adapted to be engaged by a finger 118a on the lever 118 when said lever is moved to reset the machine for a new count. The movement of the pin 213 and consequently the links 214 and 212 only swings the lever 149 in a counterclockwise direction a short distance. However, this is sufficient to permit the pin 208 on the lever 149 to control the actions of switches MS6 and MS7 shown in Figs. 13 and 22.

Referring to Figs. 22 and 27, the pin 208 is normally in a position to hold the actuator 216 of switch MS6 in an open position, said switch being of the normally closed type. When, however, through the movement of the lever 118 (Fig. 10) the pin 208 is moved away from the lever 206 where said lever is in the position shown in full in Fig. 22, the actuator member 216 of the switch follows it until the switch MS6 is closed, and since switch MS7 is a normally closed switch and both of these are in circuit with solenoid S1, this solenoid is energized and lever 206 is shifted to the dotted line position. The pin 208 works in a lever 217 loosely pivotally mounted at 218 on the plate 158, and it has spaced abutments 219 and 220. It also has an arm 221 carrying a finger 222 adapted to engage the actuator 223 of switch MS7. Switch MS7 also has an actuator 224 that is adapted to be engaged by a pad 225 on the lever 217. Switch MS7 while not shown in detail is a two pole switch so that when through the action of switch MS6 and MS7 solenoid S1 acts as above described to move the lever 206 and consequently the pin 208 from the abutment 219 of lever 217 to the abutment 220, the lever 217 will swing clockwise to bring the fingers 222 and pad 225 into operative engagement with the actuators 223 and 224 to open switch MS7 while switch MS6 is closed.

Since the circuit to solenoid S1 requires both switches MS6 and MS7 to be closed, the opening of switch MS7 will deenergize the solenoid S1. Consequently, the spring 209 will carry the lever 149 and the driving parts for the ratchet wheel 141 back to their initial driving position. In their initial driving position the pin 144 must be in the position shown, for example, in Figs. 12 and 20, but since the machine may be stopped under some conditions during a thousand count, that is, before a thousand count is completed, or the wheel 141 may be disengaged from its drive for continuous counting, it is necessary to provide means that will insure the correct registry of the pin 144 relative to the ratchet wheel 141 for subsequent counting operations. For this purpose and if the pin 144 in its thrown out position should be in any angular position substantially to the right of a vertical plane passing through the shaft 148 as shown in Fig. 20, for example, in the position shown in Fig. 32, when the lever 149 is operated, the pin will contact a wedge surface 164b on the fixed plate 164 as shown in Figs. 33 and 34 and with the aid of the finger 160 be brought into proper alinement as shown in Fig. 35. The operation by the operation of the lever 118 permits this to occur since it sets in motion the mechanism which operates the switch MS6 and MS7 and the solenoid S1, this being but a momentary operation to reset the thousand count. If by any chance the pin 144 should be to the left of a vertical plane through the shaft 148 as shown in Fig. 36, it would as the lever 149 is raised as shown in Figs. 37 and 38 move down into a pocket 164a in the plate 164, and then when the lever 149 is returned to its initial position, the pin 144 will move up out of the pocket 164a, and as it does so, will as shown in Fig. 39 be engaged by the finger 160 and swung to its proper position. This movement of the finger 160 to the registering position shown in either Fig. 35 or Fig. 36 occurs when the lever 156 which operates it is moved to its outer position. In order that the lever 156 may be operated to move the finger 160 at a time when the ratchet wheel 145 is in an intermediate position, the switch MS7 as hereinafter explained closes the circuit to another relay which acts to close the circuit to solenoid S4. At the same time this same relay closes the circuit to solenoid S5 so that under the action of solenoid S4 the pin 167 is free to travel the length of the slot 168 and to carry the pin 159 on the finger 160 with it so that the finger can push on the pin 144 so as to bring the star wheel 145 into proper registering position with the ratchet wheel 141, and at this time solenoid S4 is deenergized and lever 156 moved back with the consequent release of the pawl 152. Thus the thousand count mechanism is reset. At the same time and as previously noted the operation of the lever 118 acting through pin 118a on actuator 119a operates switch MS4 and energizes solenoid S2 and also said lever through its engagement with the push bar 78 acts to close the circuit through switch MS2 to energize solenoid S3 so that counting operations may be resumed.

The various solenoids, switches, and relays previously referred to together with the motor M are shown in the circuit diagram Fig. 30. Where the machine is not designed to count in thousands, an abbreviated diagram is shown in Fig. 31 for the control circuits and the solenoids and switches for controlling the lesser predetermined count mechanism, it being noted that the control mechanism is built up in tiers so that a purchaser may buy a machine equipped only with the lesser predetermined count controlling mechanism and then later add the additional tiers of mechanism to alsos provide for counting in thousands.

Referring to Fig. 30, a supply line 226 includes a hand controlled switch HS and also a manual reset circuit breaker and fixed terminals of switches MS1, MS2, MS4 MS5, and MS6. A return conductor 227 has one of the terminals of solenoids S1 to S6 connected thereto. The switch structure MS1 has a switch member 270 and contacts 228 and 229 and also a switch member 271 movable with member 270. A conductor 230 connects contact 228 with one terminal of the motor M. The other terminal of the motor M is connected by a conductor 231 to a conductor 232 that connects with the return conductor 227. Contact 229 of switch MS1 connects by a conductor 233 to a terminal point 234 for branch conductors 235 and 236. Conductor 235 includes the coil of solenoid S5. Conductor 236 has a red light. Both of these branch conductors then connect with the return line 227. Switch MS2 has contacts 237 and 238. Contact 237 connects by a conductor 239 with the input side of solenoid S3. Contact 238 connects by a conductor 240 to switch MS3. Switch MS3 has fixed contacts 241 and 242. Contact 241 connects by a conductor 243 to the return line 227 but has the switch 271, the switch MS8 and the yellow light Y located therein. Switch MS8 hass a fixed contact 244 as a part of conductor 243, which contact also connects by conductor 245 with a switch member 246 of a relay R1, which switch member 246 connects conductor 245 with a conductor 247 leading to the input side of solenoid S4. Contact 242 connects by a conductor 248 with the coil of a relay R2 whose output side connects by a conductor 249 with conductor 232. Switch MS4 has a fixed contact 250 connected by a conductor 251 to the input side of solenoid S2. Switch MS5 has a contact 252 connected by a conductor 253 to the input side of solenoid S1. Switch MS6 has a contact 254 connected by a conductor 255 to the conductor 253 and hence to the input side of solenoid S1. Conductor 255 also includes the switch MS7 which in its position where it contacts a fixed contact 256 connects with a conductor 257 that includes the coil of relay R1 and connects with the conductor 232.

A conductor 258 leads from line 226 to terminals of the relay switch members 259 and 260 of relay R2 and connects with a branch conductor 261 that leads to switch members 262 and 263 of relay R1. On operation of relay R1, conductor 261 through switch member 262 connects with a conductor 264 connected with conductor 247 and hence with solenoid 4. Also conductor 261 through switch member 263 connects with a conductor 265 which leads to point 234 that connects by conductor 235 with solenoid S5. Conductor 258 through switch member 259 connects with a conductor 266 that leads to the input side of solenoid S6, and this same conductor through switch member 260 is connectable with a conductor 267 which connects with conductor 230. At terminal 268 in conductor 258 a conductor 269 including a white light W leads to return conductor 227.

The movable switch member 271 of switch structure MS1 is included in conductor 243 so that normally contact 241 is connected by conductor 243 to the return conductor 227 when switch MS8 is closed.

As the modified circuit uses some of the same switches and solenoids as that just described, these switches and solenoids are similarly numeralled as their action is the same in both circuits.

Referring to the modified circuit of Fig. 31, a supply line 226a includes a hand controlled switch HSA and also a manual reset circuit breaker switch and the fixed terminals of switches MS2 and MS4. A return conductor 227a has one of the terminals of solenoids S2, S3, and S6 connected thereto. A conductor 272 across the lines 226a and 227a includes the motor M. A conductor 273 across the lines 226a and 227a includes a white light W. Switch MS2 has contacts 237a and 238a. Contact 237a connects by a conductor 239a with the input side of solenoid S3. Contact 238a connects by a conductor 240a to switch MS3. Switch MS3 is connected by a conductor 274 with the input side of solenoid S6. Swith MS4 is connectible by a conductor 275 with the input side of solenoid S2.

Referring to Fig. 31 and that part of the previously described apparatus for counting predetermined lesser numbers of coins such as from 10 to 50, the hopper 7 is loaded with coins of the desired denomination to be counted, and the gauge member 29 and the gate 26 adjusted to take the particular coin denomination, the lever L is set for the desired predetermined quantity and the line switch HSA is closed so that current is flowing through conductor 272 and the motor M. The operator then by moving either lever 118 or coin tube 73 causes push bar 78 to actuate roller 113, switch actuator 114 to move switch MS2 from contact 238a to contact 237a. Current then flows from conductor 226a to switch MS2, contact 237a, conductor 239a, solenoid S3 to release pawls 109 and 107 to permit the ratchet wheel 82 to return to its zero setting. This action is merely temporary, and as soon as the operator releases either of the controls, the push bar 78 returns to its normal position shown in Fig. 10, and switch MS2 returns to the position shown in Fig. 31 so that current then flows from conductor 226a to switch MS2, contact 238a, conductor 240a, switch MS3, conductor 274, solenoid S6 to the return line 227a. Energization of solenoid S6 acts as previously described to move feed wheel 5 down into its feeding position, and the coins from hopper 7 are then carried through the exit opening 6 and moved by said feed wheel, one at a time, past the star wheel 4 to rotate the same and through companion star wheel 91, lever 93, pawl 95, ratchet wheel 90, shaft 89, pins 86 and 87, advance the ratchet wheel 82 one tooth for every five coins, the pawl 109 holding the wheel 82 after each advance. Near the end of the predetermined count, the pin 103 on wheel 82 contacts lever 99 and swings this lever and with it the lever 102 from the position shown in Figs. 11 and 14 to the position shown in Fig. 15 so that at the end of the count one of the pins 86 or 87 can engage and push the lever 102 to operate roller 111, actuator 112 to open switch MS3 and hence the circuit through solenoid S6 so that spring 46 can at the end of the count operate through housing 36 to raise the feed wheel 5 to stop the feed of the coins. With the levers 99 and 102 in the position shown in Fig. 15, the notch 110 of lever 99 is engaged by pawl 107 so that this lever and its associated lever 102 are held in this position while the operator is removing a filled container from the coin tube 73 and replacing it with an empty container. Then as the operator again swings the coin tube 73 to move bar 78 and close switch MS2, the cycle is again repeated.

If then the operator for any reason, such as changing the coin denomination, wants to reset the predetermined count mechanism before a predetermined count has been completed, he operates the lever 118 which, in addition to operating push bar 78 to move switch MS2 to activate solenoid S3 and release pawls 109 and 107 so that the wheel 82 may return to its zero position, also operates switch MS4 to establish a circuit from conductor 226a, conductor 275, solenoid S2 to conductor 227a. Energization of solenoid S2 acts as previously noted to operate plunger 130 and its associated parts to release pins 86 and 87 from the wheel 82, reset these pins to a position such that on the release of the lever 118 and the return of the plunger 130, one of the pins 86 or 87 will be in proper position to again resume counting operation.

If the operator does not wish to use the predetermined count but wants a continuous count of coins through the operation of the counter C, then by moving the lever L to the continuous count position, the wheel 82 is moved to an angular position beyond the fifty count setting which brings the teeth of the ratchet wheel 82 out of engagement with either the pin 86 or 87 so that when switch HS is closed, the motor M is operated to drive the feed wheel, and since the switch MS2 is then engaging contact 238a current flows through conductor 226a, switch MS2, contact 238a, conductor 240a, switch MS3, conductor 274, solenoid S6, and conductor 227a so that solenoid S6 is energized to bring the feed wheel 5 to operative position to feed coins past the star wheel 4 and drive the counter C.

Referring to Fig. 30 and the drawings showing both the lesser and the thousand count control mechanism, the circuit connections have ben modified from that shown in Fig. 31 to include additional solenoids 1, 4, and 5 and their control switches.

Considering first the count of coins in thousands while counting predetermined amounts of coins of fifty or less that are multiples of a thousand.

The machine is first set for the lesser count, for example, fifty coins of any desired denomination in the same way as described above in connection with Fig. 31. In addition the lever 191 is moved to the desired total thousand count position by the setting of its end 192 in the proper notch 193, for example, the notch 4. Coins are constantly supplied to the hopper 7 as needed by feed means forming no part of the present invention.

The switch HS is closed and the count is started by the operator's actuation of the push bar 78 either through operation of the coin tube 73 or the lever 118. Current then flows through conductor 226 to switch member 270 of switch MS1, contact 228, conductor 230, motor M, conductors 231 and 232 to return line 227 to operate the motor M. Also current from conductor 226 flows through switch MS2, contact 237, conductor 239, solenoid S3 to release pawls 109 and 107 to permit the ratchet wheel to return to its zero setting. This action is merely temporary, and as soon as the operator releases either of the controls, the push bar 78 returns to its normal position shown in Fig. 10, and switch MS2 returns to the position shown in Fig. 30 so that current then flows from conductor 226 through switch MS2 to contact 238, conductor 240, switch MS3, contact 242, conductor 248, coil of relay R2, conductors 249 and 232 to return line 227. Activation of relay R2 connects switch member 259 with conductor 266 and switch member 260 with conductor 267 to establish circuits through solenoid S6 and a second circuit through motor M. The circuit through solenoid S6 is conductor 226, conductor 258, member 259, conductor 266, solenoid S6 to return conductor 227. The circuit through motor M is conductor 226, conductor 258, member 260, conductor 267, conductor 230, motor M, conductors 231 and 232 to return conductor 227. Activation of solenoid S6 lowers the feed wheel 5, and the coins are fed past the star wheel 4 to actuate the lesser predetermined count mechanism in the same way as that described above in connection with Fig. 31 so that for each predetermined count of, for example, fifty coins, the switch MS3 is moved out of contact with contact 242 by lever 102 so that the circuit to relay 2 is opened and consequently the circuit to solenoid S6 is opened and the feed wheel 5 is raised by spring 46 to stop the feed of the coins. Then as the lever 102 is released from actuator 112 of switch MS3 and the momentary actuation of switch MS2 and its solenoid S3 by the operator's operation of switch MS2 through push bar 78 the cycle is again repeated until twenty packages of fifty coins each or a thousand coins have been counted.

During this time as the shaft 89 with its crank pins 86 and 87 is given a step by step rotation to actuate the ratchet wheel 82, these pins as shown in Fig. 26 also engage and impart a similar rotation to the toothed wheel 151 on the shaft 148 that carries the ten point star wheel 145 whose pin 144 engages the thousand count ratchet wheel 141 so that the shaft 148 makes one revolution for the count of every fifty coins to move the wheel 141 one tooth. As there are twenty operative teeth on the ratchet wheel 141, the counting of twenty packages of fifty coins each will produce a full rotary movement of the thousand wheel 141.

At the end of the step by step rotary movement of wheel 141 the pin 174 thereon swings switch MS8 as previously described to close the circuit to solenoid S4 since at this time both the pin 103 on wheel 82 and pin 174 through its movement of lever 177 and 177a and pin 100 have moved the lever 102 to move switch MS3 from contact 242 to contact 241, the circuit being conductor 226, switch MS2, contact 238, conductor 240, switch MS3, contact 241, conductor 243, through switch MS8 to contact 244, conductor 245, switch member 246 of relay R1, conductor 247, solenoid S4 to return conductor 227. At the same time switch MS8 through its connection with contact 244 also lights up the yellow light Y. Activation of solenoid S4 moves lever 156 to engage pin 155 on holding pawl 152 to release it from wheel 141 so that said wheel may turn back to its zero position. As said wheel 141 turns back, the pin 174 acting on switch MS8 returns it to its initial position and also the lever 99 and 102 are released and return to their initial position so that switch MS3 again moves back to contact 242 and both wheels 82 and 141 are now reset to zero position ready to repeat the cycle. It is to be noted that at the end of each count of fifty and consequently at the end of each intermediate thousand count the wheel 82 is latched by the pawl 107 engaging notch 110 while the switch MS3 is operated by the levers 99 and 102 to deenergize solenoid S6 to permit the feed wheel 5 to move to inoperative position and that the lever 179 is released by the pin 103 from its holding position of pawl 107 shown in Fig. 23 to its release position shown in Fig. 24. Also at the end of the thousand count the pawl 196 engages one of the teeth 187 of the multiple thousand preset bar 184 so as to advance this bar one tooth for each cycle of the wheel 141. Since the bar 184 has been set for a total count of four thousand coins, the cycles of wheels 82 and 141 are repeated until at the end of the last thousand count the bar 184 moves the roller 199 and actuator 200 to shift contact member 270 of switch MS1 from contact 228 to contact 229 and contact member 271 to its off position. Shifting contact member 271 to its off position opens the circuit through switch MS8 so that at this final count when switch MS3 has moved to contact 241 by the lever 102, no current can flow through solenoid S4 even though switch MS8 is closed. Shifting of contact member 270 of switch MS1 from contact 228 to 229 opens up conductor 230 so that the motor circuit is shut off and movement of switch MS3 to contact 241 opens conductor 248 and relay R2 so that solenoid S6 is deenergized so that the feed wheel is raised.

To reset the machine back to zero position, the operator shifts lever 118 which through movement of bar 78 acts to shift switch MS2 from contact 238 to 237 to establish the circuit through solenoid S3 to move pawls 109 and 107 to release the wheel 82 so that it may move back to its zero position. At the same time switch MS4 is moved to contact 250 so that current from conductor 226 flows through conductor 251 to solenoid S2 which shifts pins 86 and 87 out of engagement with the wheel 82. Also at the same time lever 118 engages pin 213 to move links 212 and 214 to shift lever 149 to the position where pin 208 thereon is moved to allow switch MS6 to close while switch MS7 is closed so that solenoid S1 is activated to complete the swing out movement of lever 149 to disengage pin 144 from the wheel 141, the circuit being conductor 226, switch MS6, contact 254, conductor 255, switch MS7, then on contact 272 to solenoid S1. When solenoid S1 is activated, pin 208 shifts lever 217 to shift switch MS7 to contact 256. Then current from conductor 226 flows through switch MS6, contact 254, conductor 255, switch MS7, contact 256, conductor 257, coil of relay R1, conductor 232, to the return line 227. Energization of the coil of relay R1 shifts contact members 262 and 263 to a position in which current flows from conductors 226 and 258 through conductor 261, switch member 262, to conductor 264 and via conductor 247 to solenoid S4 and also through conductor 261, switch member 263 to conductor 265 and via conductor 235 to solenoid S5, thus activating both solenoids S4 and S5 so that lever 156 is then swung to engage pin 155 on pawl 152 and swing said pawl to its dotted line position 172, thus releasing it from the thousand wheel 141 and also moving it so that its projection 201 engages pin 202 and swings pawl 188 out of engagement with the bar 184 then in its final thousand position so that said bar 184 may be returned by spring 195 to its initial position, and the actuator 200 of switch structure MS1 can return to its initial position.

For counting in thousands which are not multiples of the lesser predetermined count, the operation is the same as that described above for multiple thousands except that the stopping of the feed wheel 82 at the end of each lesser predetermined count does not coincide with the stopping of the feed wheel 82 at the end of a thousand count so that the pin 103 on the wheel 82 is not in a position to operate levers 99 and 102 but is in a position, shown for example in Fig. 25, for a lesser number count of thirty coins as the end of a thousand count is reached. Under these conditions the pin 174 by its movement of lever 177 and 177a acts on pin 100 to shift the member 102 to the position shown in Fig. 25 so that at the end of the thousand count pin 86 or 87 can move member 102 to actuate switch actuator 112 to move switch MS3 from contact 242 to contact 241 and form a circuit from conductor 226, switch MS2, contact 238, conductor 240, switch MS3, contact 241, conductor 243 including switch member 271, switch MS8, which has been moved by pin 174 to connect conductor 243 with conductor 245, switch member 246 of relay R1, conductor 247 to solenoid S4 and return conductor 227. Energization of solenoid S4 moves pawl 152 out of engagement with thousand count wheel 141 and allows this wheel to return to zero without disengaging the pawl 188 so that at the end of any intermediate thousand count, the thousand count wheel is reset so that counting may continue until the end of the final thousand count when the switch member 271 is opened and the same action takes place as previously described, to wit: the motor M is stopped, the feed wheel 5 is moved to inoperative position, and the thousand count wheel 141 is held against resetting until the lever 118 is again operated. Also during intermediate thousand counts the lever 179 is used to hold the pawl 107 out of engagement with the notch 110 while the member 102 is moved to actuate switch MS3 at the end of any intermediate thousand count to release the feed wheel, but immediately thereafter the springs 104 and 105 acting on member 102 return it to its inoperative position as the pin 100 is released from member 102 during the automatic resetting of the wheel 141 so that it is not necessary for the operator to operate switch MS2.

For counting direct in one thousand units or multiple thousands the lesser count mechanism is incapacitated by shifting the lever L to continuous so as to move the teeth of the wheel 82 out of operative contact with the pins 86 and 87 and the detent 192 is set in either the notch 1 or the desired multiple thousand notch, thereby setting the bar 184 in its desired position. Then when the machine is started, if the bar 184 is set for a one thousand count, the same action of the parts and their associated control circuits will take place as has been previously described in counting the final thousand of a multiple thousand count where the pin 103 on the wheel was ineffective to shift the lever 102, so that after each thousand count the motor M is stopped and the wheel 5 raised to inoperative position and the count again resumed by the movement of the lever 118 to reset the rack bar 184 and the thousand count wheel 141. If the rack bar 184 is set for counting more than one thousand, then for each intermediate thousand, the wheel 141 is released as previously described by the release of pawl 152 therefrom on the energization of solenoid S4 through the action of switches MS3 and MS8 to permit the wheel 141 to reset itself and then counting continues until the end of the final thousand count when switch member 271 is opened, motor M is stopped, and feed wheel 5 is moved to inoperative position. Also as above described under multiple thousand conditions the lever 179 is used to hold the pawl 107 out of engagement with the notch 110 while the member 102 is moved to actuate switch MS3 at the end of any intermediate thousand count. Thus for direct counting in predetermined multiples of a thousand coins it is not necessary to operate the switch MS2 at the end of an intermediate thousand count.

For making a continuous count, both of the wheels 82 and 141 are rendered inoperative so that their associated control circuits are inoperative, but current can flow through switches MS2 and MS3 in the position shown in Fig. 30 so that solenoid S6 is being energized and the circuit to the motor is closed. In Fig. 30 the circuits for solenoid S6 for continuous counting are conductor 226, switch MS2, contact 238, conductor 240, switch MS3, contact 242, conductor 248, coil of relay R1, conductors 249 and 232, to return conductor 227, so that switch contact member 259 then connects conductors 226 and 258 to conductor 266 which includes solenoid S6.

It will be noted that the pins 86 and 87 are not engaging the wheel 82 on the end of a predetermined count so they do not interfere with its resetting to zero position and that the pawl 146 permits a reverse movement of the ratchet wheel 151 and pin 144 on resetting under the control of lever 118, also that the pin 144 is not in a position to engage the ratchet wheel 141 during resetting at the end of a thousand count.

In Fig. 30 the white light W through conductors 226 and 258, post 268, conductors 269 and 227 is operated as soon as switch HS is closed. The yellow light Y lights after every thousand count when switch MS8 connects solenoid S4 in the circuit controlling the thousand count. The red light R lights at the end of every final predetermined count when switch member 263 closes the circuit to solenoid S5 to completely release the pawl 152.

We desire it to be understood that this invention is not to be limited to any particular form or arrangement of parts except in so far as such limitations are included in the claims.

What we claim as our invention is:

1. In a coin counting machine having a coin discharge passage, a coin operated member in said passage, means for supplying coins to said passage, and a rotatable feed wheel for carrying coins from said supply means past said coin operated member to actuate the same, the combination of predetermined count control mechanism for said feed wheel including a settable toothed wheel and drive means for said settable wheel including a rotary drive pin engageable with said wheel and operatively connected to said coin operated member, means under the control of the operator for disconnecting said drive pin from said wheel to permit said wheel to return to its zero position, and means engageable with said pin to set it to a registry position in its disconnected position and maintain it in this position until again operatively connected to said toothed wheel.

2. In a coin counting machine having a coin discharge passage, a coin operated member in said passage, means for supplying coins to said passage, and a rotatable feed wheel for carrying coins from said supply means past said coin operated member to actuate the same, the combination of predetermined count control mechanism for said feed wheel including a settable toothed wheel and drive means for said settable wheel including a rotary drive pin engageable with said wheel and operatively connected to said coin operated member, means under the control of the operator for disconnecting said drive pin from said wheel to permit said wheel to return to its zero position before completing a predetermined count, wedge means engageable with said pin to set it to a zero position, as it moves to disconnected position, and a pivoted finger adapted to maintain said pin in its set zero position until again operatively connected to said toothed wheel.

3. In a coin counting machine having a coin discharge passage, a coin operated member in said passage, means for supplying coins to said passage, and a feed wheel for carrying coins from said supply means past said coin operated member to actuate the same, the combination of a settable count control mechanism for said feed wheel for counting in units of a thousand coins including a ratchet wheel, drive means for said wheel operatively connected to said coin operated member for advancing said ratchet wheel step by step, a holding pawl for said wheel, a settable multiple thousand member, means for releasing said pawl at the end of each intermediate thousand count to permit said ratchet wheel to reset itself, means actuated by said ratchet wheel for moving said settable multiple thousand member for each thousand count, and means controlled by said member at the end of the final multiple thousand count for rendering said feed wheel inoperative to feed coins.

4. In a coin counting machine having a coin discharge passage, a coin operated member in said passage, means for supplying coins to said passage, and a feed wheel for carrying coins from said supply means past said coin operated member to actuate the same, and means for rendering said feed wheel operative to feed coins, the combination of a settable predetermined count control mechanism for said last named means for counting in units of lesser amounts, for example, ten to fifty coins, operatively connected to said coin operated member, feed wheel control means operable by said count control mechanism at the end of predetermined count for rendering said feed wheel inoperative to feed coins, a count control mechanism for said feed wheel for counting in units of a thousand coins also operatively connected to said coin operative member, means for automatically resetting said thousand count control mechanism, means operable by said last named count control mechanism to render the feed wheel control means operable by the first named count control mechanism operable, intermediate the end of a predetermined lesser amount count which is a non-multiple of a thousand count, for rendering said feed wheel inoperative to continue the lesser amount coin count at the end of a thousand count while said thousand count control mechanism is being reset.

5. In a coin counting machine having a coin discharge passage, a coin operated member in said passage, means for supplying coins to said passage, and a feed wheel for carrying coins from said supply means past said coin operated member to actuate the same, the combination of predetermined count control mechanism for said feed wheel for counting in units of lesser amounts, for example, ten to fifty coins, including a settable member and drive means for said member operatively connected to said coin operated member, means for moving said settable member out of operative engagement with said drive means, a count control mechanism for said feed wheel for counting in units of a thousand coins including a settable member and drive means therefor operatively connected with the drive means for the lesser count control mechanism, a shiftable support for said last named drive means, and means for shifting said support to disconnect said drive means for the thousand count control mechanism from its settable member and from the drive means for the lesser count control mechanism.

6. In a coin counting machine having a coin discharge passage, a coin operated member in said passage, means for supplying coins to said passage, and a rotatable feed wheel for carrying coins from said supply means past said coin operated member to actuate the same, the combination of count control mechanism for said feed wheel including a toothed wheel and drive means for said wheel including a rotary drive pin engageable with said wheel and operatively connected to said coin operated member, means under the control of the operator for disconnecting said drive pin from said wheel to permit either resetting of said wheel or rendering it inoperative to control the count of coins, means engageable with said pin to reset it as it moves to disconnected position, and an independently operated pivoted finger engageable with said pin as it is returned to its operative position to insure proper registry of said pin in operative relation to said wheel.

7. In a coin counting machine having a coin discharge passage, a coin operated member in said passage, means for supplying coins to said passage, and a rotatable feed wheel for carrying coins from said supply means past said coin operated member to actuate the same, the combination of predetermined count control mechanism for said feed wheel including a settable toothed wheel and drive means for driving said settable wheel from a zero position to a predetermined count position including a rotary drive pin engageable with said wheel and operatively connected to said coin operated member, said ratchet wheel drive means having an initial registry position relative to said ratchet wheel when the wheel is at its zero position, means under the control of the operator for disconnecting said drive pin from said toothed wheel while the same is in a count registering position to permit it to return to its zero position, and means for insuring proper registry of said pin in its initial reset position relative to said wheel.

8. In a coin counting machine having a coin discharge passage, a coin operated member in said passage, means for supplying coins to said passage, and a rotatable feed wheel for carrying coins from said supply means past said coin operated member to actuate the same, the combination of predetermined count control mechanism for said feed wheel for controlling coin counts, ranging from ten to fifty coins, including a settable toothed wheel and drive means for said settable wheel including a rotary drive pin engageable with said wheel and operatively connected to said coin operated member, means under the control of the operator for disconnecting said drive pin from said toothed wheel while the same is in a count registering position to permit said wheel to return to its zero position, means for insuring proper registry of said pin in its reset position relative to said wheel, a thousand count controlling toothed wheel, drive means for said last mentioned count control wheel operatively connected to the drive means for the first mentioned toothed wheel and including a rotary drive pin, means under the control of the operator for disconnecting said last named pin from said thousand count wheel and also from the drive means for said first mentioned count control wheel, and means for insuring proper registry of said last mentioned pin with said thousand count wheel in its reset position relative thereto.

9. In a coin counting machine having a coin discharge passage, a coin operated member in said passage, means for supplying coins to said passage, a rotary feed wheel for carrying coins from said supply means past said coin operated member to actuate the same, means for rendering said feed wheel operative to feed coins, and means for rendering said feed wheel inoperative to feed coins, the combination of means including a shiftable member movable from an inoperative to an operative position to control said last two mentioned means, settable predetermined count control mechanism for controlling coin counts, ranging from ten to fifty coins, operatively connected to said coin operated member and adapted to move said shiftable member to its operative position at the end of a predetermined count to control the aforesaid last two mentioned means, a thousand count control mechanism operatively connected to said coin operated member and also adapted to move said shiftable member to its operative position at the end of a count of a thousand coins to control the aforesaid two last mentioned means, means for holding said settable count control mechanism at the end of a predetermined lesser count in a set position while said shiftable member is being operated in its operative position, operator controlled means for resetting said holding means, and means operative to prevent operation of said holding means while said shiftable member is being operated in its operative position for a thousand count if said count is not a multiple of the lesser count control mechanism.

10. In a coin counting machine having a coin discharge passage, a coin operated member in said passage, means for supplying coins to said passage, and a rotatable feed wheel for carrying coins from said supply means past said coin operated member to actuate the same, the combination of thousand count control mechanism for said feed wheel including a resettable ratchet wheel and means driven by said coin operated member for driving said wheel step by step until a thousand count is completed, a holding pawl for said ratchet wheel, a settable multiple thousand rack member, means for setting said rack member to the desired number of thousands, means operated by said ratchet wheel for advancing said rack member step by step for each count of a thousand, means for releasing said holding pawl at the end of each intermediate thousand count to permit said wheel to reset itself, and means operated by said rack member at the end of the last predetermined number of thousands count to stop the drive of said feed wheel.

11. In a coin counting machine having a coin discharge passage, a coin operated member in said passage, means for supplying coins to said passage, a rotary feed wheel for carrying coins from said supply means past said coin operated member to actuate the same, means for rendering said feed wheel operative to count coins, and means for rendering said feed wheel inoperative to count coins, the combination of a pair of members movable from an operative to an inoperative position to control said last two mentioned means, one of said members being pivoted intermediate its ends and having a locking notch, a holding pawl engageable with said notch, the other of said members being shiftably mounted on said pivoted member, spring means normally urging said members to an inoperative position, settable predetermined count control mechanism for controlling coin counts, ranging from ten to fifty coins, operatively connected to said coin operated member and adapted to move said members to their operative position at the end of a predetermined count and move the shiftable member to control the aforesaid last two mentioned means, said notched member being engaged by said holding pawl near the end of the predetermined count to hold said pair of members in operative position after the count is completed, and operator controlled means for releasing said pawl to permit said members returning to their inoperative position at the start of a next predetermined count.

12. In a coin counting machine having a coin discharge passage, a coin operated member in said passage, means for supplying coins to said passage, a rotary feed wheel for carrying coins from said supply means past said coin operated member to actuate the same, means for rendering said feed wheel operative to count coins, and means for rendering said feed wheel inoperative to count coins, the combination of a pair of members movable from an operative to an inoperative position to control said last two mentioned means, one of said members being pivoted intermediate its ends and having a locking notch, a holding pawl adapted to engage said notch, the other of said members being shiftably mounted on said pivoted member, spring means normally urging said members to an inoperative position, settable predetermined count control mechanism for controlling lesser amounts of coins operable to move said pair of members for a definite coin count but settable to a continuous count position, a thousand count control mechanism for counting in multiple thousands and including a thousand count control member adapted to be automatically reset at the end of each intermediate count of a thousand, means controlled by said last named member to move said pair of members to their operative position at the end of a thousand count to permit movement of said shiftable member to control the aforesaid last two mentioned means to momentarily render said feed wheel inoperative to feed coins, and means also controlled by said last named member to prevent operation of said holding pawl at the end of the thousand count to permit the automatic resetting of said thousand count control member.

13. In a coin counting machine having a coin discharge passage, a coin operated member in said passage, means for supplying coins to said passage and a rotatable feed wheel for carrying coins from said supply means past said coin operated member to actuate the same, the combination of predetermined count control mechanism for said feed wheel including a settable toothed wheel and a rotatable drive member for driving said toothed wheel step by step until the predetermined count is completed, a shiftable support for said drive member, means including a pawl and ratchet drive connection between said drive member and said coin operated member when said drive member is disposed in driving relation with said toothed wheel, means for shifting said support to move said drive member out of driving relation with said toothed wheel and disconnect said pawl and ratchet drive connection, and means controlled by the operator for controlling the means for shifting said support.

14. In a coin counting machine having a coin discharge passage, a coin operated member in said passage, means for supplying coins to said passage and a rotatable feed wheel for carrying coins from said supply means past said coin operated member to actuate the same, the combination of predetermined count control mechanism for said feed wheel including a settable toothed wheel, and a rotatable drive member having diametrically disposed pins for alternate step by step driving engagement with said toothed wheel until the predetermined count is completed, a shiftable support for said drive member, means including a pawl and ratchet drive connection between said drive member and said coin operated member when said drive member is disposed in driving relation with said toothed wheel and separable from said drive member when said drive member is disposed out of driving relation with said toothed wheel, means for shifting said support to move said drive member out of driving relation with said toothed wheel, means controlled by the operator for controlling the means for shifting said support, and means engageable with one of said pins to set said drive member in a registry position in its disconnected position and maintain it in this position until again operatively connected to said toothed wheel.

15. In a coin counting machine having a coin discharge passage, a coin operated member in said passage, means for supplying coins to said passage, a rotatable feed wheel alternatively movable from a non-operative to an operative position for carrying coins from said supply means past said coin operated member to actuate the same: the combination of predetermined count control mechanism for said feed wheel including a settable ratchet wheel and means driven by said coin operated member for driving said ratchet wheel from a zero position step by step until the predetermined count is completed; said ratchet wheel drive means having an initial registry position relative to said ratchet wheel when the wheel is at its zero position, a holding pawl for said ratchet wheel; an electric control circuit including a feed control solenoid and its control switch; means operated by said solenoid to render said feed wheel operative to feed coins during the predetermined count; means controlled by said ratchet wheel and operated by its drive means to operate said control switch at the end of the predetermined count to render said feed control solenoid and hence said feed wheel inoperative; an electric circuit including a start solenoid and its control switch; and means under the control of the operator for operating said last named control switch to energize said start solenoid; and means operated by said start solenoid to release said holding pawl, reset the means for operating the feed control switch to permit said ratchet wheel to return to its zero position and the feed wheel to its operative position, and the drive means to its initial registry position.

16. In a coin counting machine having a coin discharge passage, a coin operated member in said passage, means for supplying coins to said passage, a rotary feed wheel for carrying coins from said supply means past said coin operated member to actuate the same, means for rendering said feed wheel operative to feed coins, and means for rendering said feed wheel inoperative to feed coins: the combination of means including a shiftable member movable from an inoperative to an operative position to respectively control the aforementioned means controlling the operation of said feed wheel; settable predetermined count control mechanism for controlling coin counts, ranging from ten to fifty coins, operatively connected to said coin operated member and adapted to move said shiftable member to its operative position at the end of a predetermined count to render the feed wheel inoperative; reset means for rendering the shiftable member inoperative concurrently with the start of a new coin count, a cumulative thousand count control mechanism adapted for operative connection with said coin operated member while said first named count control mechanism is operatively connected therewith; and releasable stop means controlled by said predetermined count control mechanism operably engageable with said thousand count control mechanism and arranged to restrain said mechanism from acting upon said shiftable member until the end of a thousand coin count, said thousand count control mechanism being adapted to move said shiftable member to its operative position at the end of a count of a thousand coins upon release of said stop means to render the feed wheel inoperative for feeding coins.

17. In a coin counting machine having a coin discharge passage, a coin operated member in said passage, means for supplying coins to said passage and a rotatable feed wheel for carrying coins from said supply means past said coin operated member to actuate the same, the combination of a predetermined thousand count control mechanism for said feed wheel including a settable ratchet wheel having a zero position and drive means for said settable wheel operatively connected to said coin operated member, said drive means having an initial registry position relative to said ratchet wheel when the wheel is at its zero position, a holding pawl for said wheel and means controlled by said wheel for releasing said holding pawl to permit said wheel to reset itself, and means for thereafter bringing said holding pawl and said drive means into operative and registrable connection with said wheel to repeat the cycle, and settable means for predetermining the number of thousand count cycles.

References Cited in the file of this patent

UNITED STATES PATENTS

| | | |
|---|---|---|
| 1,128,561 | Webendorfer | Feb. 16, 1915 |
| 1,811,503 | Janovsky | June 23, 1931 |
| 1,914,362 | Donnellan | June 20, 1933 |
| 2,323,492 | Seemel | July 6, 1943 |
| 2,378,828 | Buchholz et al. | June 19, 1945 |
| 2,437,721 | Barganz | Mar. 16, 1948 |
| 2,645,234 | Buchholz | July 14, 1953 |
| 2,675,008 | Buchholz | Apr. 13, 1954 |
| 2,679,849 | Buchholz | June 1, 1954 |
| 2,750,949 | Kulo et al. | June 19, 1956 |

FOREIGN PATENTS

| | | |
|---|---|---|
| 468,978 | Great Britain | July 16, 1937 |